(12) United States Patent
Idicula et al.

(10) Patent No.: US 8,209,361 B2
(45) Date of Patent: Jun. 26, 2012

(54) TECHNIQUES FOR EFFICIENT AND SCALABLE PROCESSING OF COMPLEX SETS OF XML SCHEMAS

(75) Inventors: Sam Idicula, Santa Clara, CA (US); Asha Tarachandani, Newark, CA (US); Sivasankaran Chandrasekar, Menlo Park, CA (US); Vijay Medi, Sunnyvale, CA (US); Ali Tabar, Stanford, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 207 days.

(21) Appl. No.: 12/689,729

(22) Filed: Jan. 19, 2010

(65) Prior Publication Data

US 2011/0179089 A1 Jul. 21, 2011

(51) Int. Cl.
*G06F 17/30* (2006.01)
(52) U.S. Cl. .......................... 707/803; 707/796; 707/801
(58) Field of Classification Search .................. None
See application file for complete search history.

(56) References Cited

U.S. PATENT DOCUMENTS

| | | | |
|---|---|---|---|
| 6,772,413 B2 | 8/2004 | Kuznetsov | |
| 7,475,093 B2 * | 1/2009 | Tomic et al. ........................ | 1/1 |
| 7,490,093 B2 * | 2/2009 | Jain et al. ........................... | 1/1 |
| 7,536,676 B2 | 5/2009 | Baker et al. | |
| 7,716,577 B2 | 5/2010 | Behrens et al. | |
| 7,831,540 B2 | 11/2010 | Medi et al. | |
| 2004/0073870 A1 * | 4/2004 | Fuh et al. ...................... | 715/513 |
| 2005/0050092 A1 * | 3/2005 | Jain et al. .................... | 707/104.1 |
| 2005/0177543 A1 * | 8/2005 | Chen et al. ........................ | 707/1 |
| 2005/0289175 A1 * | 12/2005 | Krishnaprasad et al. ..... | 707/102 |
| 2006/0036755 A1 | 2/2006 | Abdullah et al. | |
| 2007/0143330 A1 * | 6/2007 | Tang .............................. | 707/102 |
| 2009/0063952 A1 * | 3/2009 | Raghavachari et al. ...... | 715/234 |
| 2009/0112890 A1 | 4/2009 | Medi et al. | |
| 2009/0112902 A1 | 4/2009 | Sthanikam et al. | |
| 2009/0287670 A1 * | 11/2009 | Hou et al. ......................... | 707/4 |
| 2009/0287719 A1 * | 11/2009 | Warner et al. ................. | 707/100 |
| 2010/0235725 A1 * | 9/2010 | Drayton et al. ............... | 715/234 |
| 2011/0179088 A1 | 7/2011 | Medi et al. | |

OTHER PUBLICATIONS

Zhang et al., "Binary XML Storage and Query Processing in Oracle 11g", Proc. VLDB Endow. 2,2, Dated Aug. 2009, 12 pages.
U.S. Appl. No. 12/689,196, filed Jan. 18, 2010, Office Action, mailed Dec. 21, 2011.

* cited by examiner

*Primary Examiner* — Debbie Le
(74) *Attorney, Agent, or Firm* — Hickman Palermo Truong Becker Bingham Wong LLP

(57) ABSTRACT

Techniques are described herein for efficient and scalable processing of complex sets of XML schemas. The techniques described herein provide for reducing duplication of schema elements in volatile memory by building an XML schema in-memory model that stores repeating schema elements in in-memory data structures that are separate from in-memory data structures that store the parent schema elements which logically include or otherwise refer to the repeating schema elements. The techniques described herein also provide for faster generation of an in-memory model of an XML schema by pre-loading, in data structures on persistent storage, of schema elements from dependent XML schemas that are referenced and/or incorporated by the XML schema. The techniques described herein also provide for efficient processing of inter-dependent XML schemas by tracking all unresolved schema elements from dependent XML schemas and freeing the portions of volatile memory, which are used to process schema elements from the dependent XML schemas, as soon as the dependent schema elements being processed are stored in data structures on persistent storage.

44 Claims, 5 Drawing Sheets

TECHNIQUES FOR EFFICIENT AND SCALABLE PROCESSING OF COMPLEX SETS OF XML SCHEMAS

FIELD OF THE INVENTION

The present invention relates to processing of metadata information for eXtensible Markup Language (XML) data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditional schema processors and compilers are designed to process XML schemas based on assumptions that typically do not hold for large and complex industry schemas. For example, traditional schema processors and compilers typically process an XML schema by storing the entire schema in volatile memory in order not to incur overhead for any disk accesses and disk retrievals during schema-based operations that process XML data. Further, the volatile memory structures used by traditional schema processors and compilers to store XML schemas are not space-efficient because a lot of schema information is deliberately stored in multiple different copies in order to allow for easy access during the schema-based operations that process XML data. For example, traditional schema processors and compilers typically store in volatile memory the schema elements of an XML schema with or under their corresponding parent elements, which results in storing multiple copies of the same repeating schema elements that appear in the schema under multiple different parent elements.

At least in part because of such deliberate duplication of schema information, the in-memory size of XML schemas becomes a problem for traditional schema processors and compilers when such processors and compilers need to process large and complex industry schemas. This problem is exacerbated by the fact that a large industry XML schema would typically reference, include, or otherwise incorporate multiple other schemas in-full or in-part. Thus, even though some traditional schema processors and compilers may use memory structures and processing techniques that are designed for faster processing, such memory structures and processing techniques work well only for small XML schemas that do not have large in-memory sizes.

The large in-memory sizes of complex industry XML schemas cause another processing problem for traditional schema processors and compilers. When loading such XML schemas into memory, traditional schema processors and compilers need to allocate and track a lot of memory blocks and objects, thus incurring a significant memory management overhead. This memory management overhead may be so significant that it may cause traditional schema processors and compilers to incur very high processing times (e.g., because of excessive swapping of memory pages to and from disk) or even stall as they run out of memory when processing large and complex industry XML schemas.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
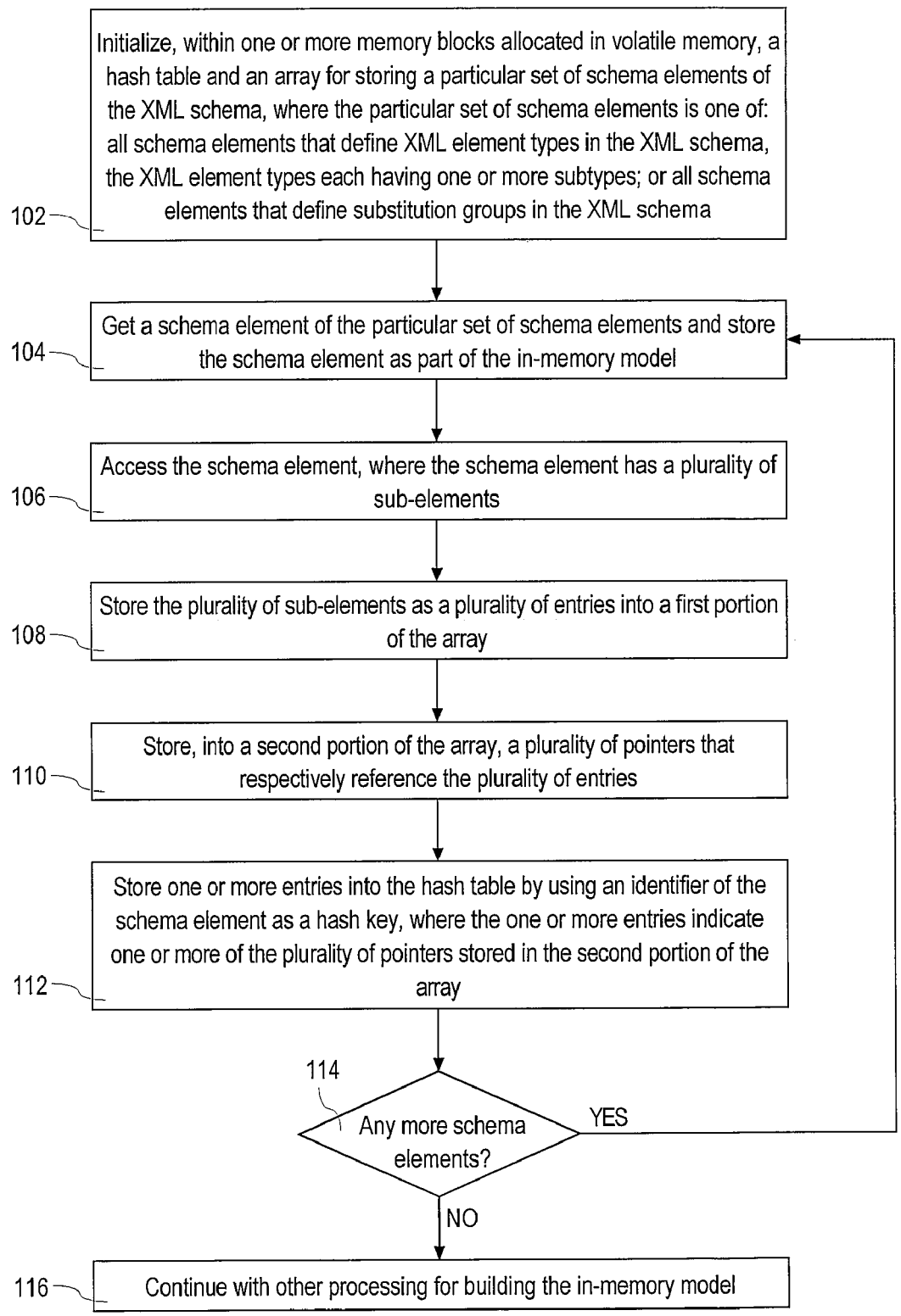
FIG. 1 is a flow diagram that illustrates an example method for building an in-memory model of an XML schema according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for efficient and scalable processing of complex sets of XML schemas. The techniques described herein provide for reducing duplication of schema elements in volatile memory by building an in-memory model of an XML schema that stores repeating schema elements in in-memory data structures that are separate from in-memory data structures that store the parent schema elements which logically include or otherwise refer to the repeating schema elements. For example, the techniques described herein provide for storing in the same in-memory data structure(s) all schema elements in the XML schema that define XML element types and any subtypes of the XML element types. In another example, the techniques described herein provide for storing in the same in-memory data structure(s) all schema elements in the XML schema that define substitution groups and any members of the substitution groups.

The techniques described herein provide for faster generation of an in-memory model of an XML schema by pre-loading, in data structures on persistent storage, of schema elements from dependent XML schemas that are referenced, included, and/or incorporated by the XML schema. For example, the techniques described herein provide for storing schema elements from dependent XML schemas in data structures on persistent storage, where the schema elements may include: parent elements that define XML element types, and sub-elements of the parent elements that define subtypes of the XML element types; and/or head elements that define substitution groups, and sub-elements of the head elements that define members of the substitution groups.

The techniques described herein provide for efficient processing of inter-referenced XML schemas by tracking all unresolved schema elements from dependent XML schemas and freeing the portions of volatile memory, which are used to process schema elements from the dependent XML schemas, as soon as the dependent schema elements being processed are stored in data structures on persistent storage. For example, a parent XML schema may include references to a dependent XML schema and the dependent XML schema in turn may include references to the parent XML schema. In this situation, the techniques described herein provide for: tracking schema elements, from the dependent XML schema, that refer to the parent XML schema; storing such dependent schema elements in data structures on persistent storage even though these dependent schema elements are not fully resolved against the parent XML schema; and resolving, against the parent XML schema at the time an in-memory model of the XML schema is being built, those unresolved dependent schema elements that need to be included in the in-memory model of the XML schema. The techniques described herein also provide for efficient use of volatile memory while processing schema elements from a dependent XML schema by executing separate recursive calls to extract separate schema elements from the dependent XML schema and to store these dependent schema elements in data structures on persistent storage, where the portion of volatile memory used by each recursive call is released as soon as the dependent schema element being processed is stored in the data structures on the persistent storage.

Substitution Groups and XML Element Types and Subtypes

As used herein, "XML schema" refers to a collection of metadata information that is expressed as a set of schema elements that define and describe XML data. The schema elements of an XML schema may define various items including, but not limited to, XML elements and attributes thereof, types and subtypes of XML elements, and various other constraints on and properties of the structure and content of instances of the XML schema. As used herein, an "instance" of an XML schema is an XML document whose structure and content conform to the XML schema, where "XML document" refers to a set of data expressed in XML such as, for example, an XML document file or an XML data stream. One example of an XML schema is a schema that is expressed in and conforms to a W3C XML Schema Definition Language (XSD), one version of which is described in a document that is titled "W3C XML Schema Definition Language (XSD) 1.1 Part 1: Structures" and that was released as W3C Candidate Recommendation on 30 Apr. 2009 at "http://www.w3.org/TR/xmlschema11-1/". It is noted, however, that the techniques for efficient and scalable processing of complex sets of XML schemas are not limited to being implemented for any particular type of an XML schema; rather, the techniques described herein can be implemented for any now known or later developed types of schemas that provide for describing the structure and constraining the contents of XML documents including, but not limited to, Document Type Definitions (DTD) and other structured specifications that are expressed in a markup language.

There are several technical challenges that arise in the context of processing requests for specific information about an XML schema. For example, given a certain XML element, a schema processor (e.g., such as a module or logic operable to access, compile, or otherwise process schemas) may be requested to determine what are the child elements that can be included in this XML element, in what order these child elements can appear within the XML element, and what are the characteristics and properties of these child elements. In another example, given a particular instance of an XML schema, a schema processor may need the ability to examine various XML elements that occur in that particular instance and to encode the XML elements based on the metadata information expressed and represented in the schema for the purposes of efficiently storing or transmitting the instance.

The technical challenges arising in the context of processing requests for specific content from XML schemas are exacerbated by the growing use of XML schemas to represent format and structure of industry-wide data. For example, the U.S. Securities and Exchange Commission has adopted use of a set of XML schemas to define the U.S. Generally Accepted Accounting Principles (US GAAP), which specify the format, structure, and content of reports that publicly traded companies are required to file for their quarterly earnings and other filings with the Commission. The set of US GAAP XML schemas is very complex, runs for many pages, includes a number of inter-referenced schemas, and defines structures of great complexity.

In the context of processing complex industry XML schemas, various technical challenges arise that cannot be solved by the known traditional approaches for processing XML schemas. The causes of these technical challenges for such industry XML schemas include, but are not limited to, the extensive use of a large number of XML element subtypes, the extensive use of substitution groups, and the extensive use of references to dependent XML schemas, of recursive references to the same XML schema, and of circular references among several inter-referenced XML schemas.

XML Element Types and Subtypes

One of the causes of the technical challenges for processing industry XML schemas is the extensive use of the ability to extend XML element types with subtypes. A schema element in an XML schema may define an XML element as having a "simple" type a "complex" type. A "simple" type is an element type definition that does not allow XML elements to include attributes or child XML elements. A "complex" type is an element type definition that allows XML elements to include attributes and child elements. A "complex" type further allows XML elements to include sequences of elements, where the sequences can be ordered (e.g., the elements in the sequence need to appear in the exact order) or unordered. An XML element type that is defined in an XML schema can have one or more subtypes, where an XML element subtype can inherit from and extend a previously defined and/or existing XML element type. In an XML schema, an XML element type is defined in a schema element that is referred to herein as a "parent element"; a subtype of an XML element type is defined in a separate schema element that is referred to herein as a "sub-element" of the parent element that defines the XML element type.

For example, an XML element type "Address" is defined by the schema element illustrated in Table 1 below.

TABLE 1

A schema element that defines an "Address" XML element type

```
<xs:complexType name="Address">
    <xs:sequence>
        <xs:element name="streetNumber"/>
        <xs:element name="streetName" maxOccurs="2"/>
        <xs:element name="City"/>
        <xs:element name="State"/>
        <xs:element name="zipCode"/>
    </xs:sequence>
</xs:complexType>
```

The schema element illustrated in Table 1 defines that child element "streetName" can occur at most twice in an XML element instance of the "Address" type. An instance of an XML element conforming to the above XML element type may be as follows:

```
<mailAddr>
    <streetNumber>1234</streetNumber>
    <streetName>Main St</streetName>
    <streetName>Cesar Chavez Way</streetName>
    <City >AnyTown</City>
    <State>CA</State>
    <zipCode>94999</zipCode>
</mailAddr>
```

A subtype may be derived by extending an XML element type or subtype. For example, a subtype of the "Address" XML element type may be defined by the schema element illustrated in Table 2 below:

TABLE 2

A schema element that defines a subtype of the "Address" XML element type

```
<xs:complexType name="shippingAddress">
    <xs:complexContent>
        <xs:extension base="Address">
            <xs:sequence>
                <xs:element name="zipPlus4" minOccurs="1"
                maxOccurs="1"/>
            </xs:sequence>
        </xs:extension>
    </xs:complexContent>
</xs:complexType>
```

The schema element illustrated in Table 2 defines the "shippingAddress" subtype by extending the "Address" XML element type to include the additional child element "zipPlus4". An instance of an XML element conforming to the "shippingAddress" XML element subtype may be as follows:

```
<shipTo>
    <streetNumber>5678</streetNumber>
    <streetName>Wall St</streetName>
    <City >BigTown</City>
    <State>NY</State>
    <zipCode>10999</zipCode>
    <zipPlus4>1583</ zipPlus4>
</shipTo>
```

A subtype may also be derived by restricting an XML element type or subtype. For example, a subtype of the "Address" XML element type may be defined by the schema element illustrated in Table 3 below:

TABLE 3

A schema element that defines a subtype of the "Address" XML element type

```
<xs:complexType name="mailingAddress">
    <xs:complexContent>
        <xs:restriction base="Address">
            <xs:sequence>
                <xs:element name="streetNumber" />
                <xs:element name="streetName" minOccurs="1"
                maxOccurs="1"/>
                <xs:element name="City"/>
                <xs:element name="State"/>
                <xs:element name="zipCode" minOccurs="1"
                maxOccurs="1"/>
```

TABLE 3-continued

A schema element that defines a subtype of the "Address" XML element type

```
            </xs:sequence>
        </xs:restriction>
    </xs:complexContent>
</xs:complexType>
```

The schema element illustrated in Table 3 defines the "mailingAddress" subtype by restricting the "Address" XML element type to require that child elements "streetName" and "zipCode" occur exactly once in an XML element instance of the "mailingAddress" subtype. An instance of an XML element conforming to the "mailingAddress" XML element subtype may be as follows:

```
<mailTo>
    <streetNumber>5678</streetNumber>
    <streetName>Wall St</streetName>
    <City >BigTown</City>
    <State>NY</State>
    <zipCode>10999</zipCode>
</mailTo>
```

A subtype may also be derived by subsumption from an XML element type or from another subtype. For example, the schema element illustrated in Table 4 below defines an XML element that subsumes the properties of the "Address" XML element type:

TABLE 4

A schema element that defines an XML element by subsumption

```
<element name="localAddress" type="Address"/>
```

The schema element illustrated in Table 4 defines the "localAddress" XML element as having the "Address" XML element type. This means that instances of an XML element named "localAddress" would be valid if they match the "Address" XML element type. Further, the schema element illustrated in Table 4 indicates that instances of the "localAddress" XML element would also be valid if they match a subtype that is derived from the "Address" XML element type (e.g., such as the "mailingAddress" subtype that is defined in Table 3 above)—provided that the attribute "xsi:type" is added to the instances of the "localAddress" XML element in an XML document. For example, the following XML element instance

```
<localAddress xsi:type="mailingAddress">
    <streetNumber>1234</streetNumber>
    <streetName>Main St</streetName>
    <City >AnyTown</City>
    <State>CA</State><zipCode>94999</zipCode>
</localAddress>
``` would be valid if it matches the "Address" XML element type or the "mailingAddress" subtype of the "Address" XML element type, where "xsi" refers to the XML schema that includes the schema element defining the "mailingAddress" subtype.

The above mechanisms for derivation of subtypes from XML element types and subtypes also provide for controlling the derivation by using various element attributes. For example, when included in a schema element that defines a certain XML element type or subtype, the attribute final="restriction"

forbids the definition of derived subtypes from the certain XML element type or subtype by restriction. When included in a schema element that defines a certain XML element type or subtype, the attribute block="extension"

forbids the definition of substitution of derived subtypes from the certain XML element type or subtype by extension. It is noted that each of the "final" and the "block" attributes can take the values of "restriction", "extension", or "#all", where the value "#all" forbids both restriction and extension of XML element types or subtypes.

Substitution Groups

XML schemas provide the substitution group mechanism as an alternative to subtype derivation from XML element types. Along with the extensive use of the ability to extend XML element types with subtypes, the extensive use of substitution groups is another of the causes of the technical challenges for processing industry XML schemas. The extensive use of substitution groups in industry XML schemas greatly compounds the technical challenges in processing such schemas because substitution groups can, and are, used in conjunction with the mechanisms for deriving subtypes from XML element types.

A substitution group is a set of multiple XML elements that can be substituted for another XML element in a given instance of an XML schema. The schema element, which defines an XML element being able to be substituted, is referred to herein as the "head element" of the substitution group. A member of a substitution group is defined in a separate schema element that is referred to herein as a "sub-element" of the head element of the substitution group.

For example, a schema element that defines a head element of a substitution group is illustrated in Table 5 below.

TABLE 5

A schema element that defines a head element

<element name="anyAddress" type="Address"/>

The schema element illustrated in Table 5 is a head element that defines an XML element that is named "anyAddress" and that is of the "Address" XML element type illustrated in Table 1 above. One example of a sub-element that defines a member of a substitution group is illustrated in Table 6 below.

TABLE 6

A schema element that defines a member of a substitution group

<element name="internationalAddress" substitutionGroup="anyAddress"/>

The schema element illustrated in Table 6 defines an XML element that is named "internationalAddress" and that is a member of the substitution group headed by the "anyAddress" XML element. Another example of a sub-element that defines a member of a substitution group is illustrated in Table 7 below.

TABLE 7

A schema element that defines a member of a substitution group

<element name="USAddress" type="mailingAddress" substitutionGroup="anyAddress"/>

The schema element illustrated in Table 7 defines an XML element that is named "USAddress" and that is also a member of the substitution group headed by the "anyAddress" XML element illustrated in Table 5. In addition, by including the element attribute type="mailingAddress", the schema element illustrated in Table 7 indicates that the "USAddress" XML element is of a "mailingAddress" XML element type (e.g., such as the subtype "mailingAddress" of the "Address" XML element type illustrated in Table 3 above). It is noted that the use of the "type" element attribute in schema elements that define members of a substitution group is not limited to indicating any particular subtype or any particular XML element type; however, the element type of a substitution group member must either be the same as the element type of the head element of the group, or be derived from the element type of the head element by either extension or restriction.

The schema elements illustrated in Tables 6 and 7, when included in an XML schema, indicate that the members of the substitution group (e.g., such as the "internationalAddress" and "USAddress" XML elements defined in Tables 6 and 7, respectively) may be used interchangeably in an instance of the XML schema, and that an instance of the XML schema can include any member of the substitution group in order to satisfy the validation requirements of the XML schema. In other words, an XML document would be a valid instance of an XML schema when the XML document includes an XML element that conforms to any member of a substitution group at any location—in the structure of the XML document prescribed by the XML schema—that requires the presence of the same or a different member of that same substitution group.

In industry XML schemas, substitution groups are extensively used in conjunction with XML element types and subtypes thereof. The schema elements of an XML schema may define members of a substitution group that belong to an XML element type or subtype that is the same as, or is derived by extension or restriction from, the XML element type of the head element of the substitution group.

For example, one schema element of an XML schema, which describes a Purchase Order document, may define an XML element that is of the "Address" XML element type; another schema element of the XML schema may define an XML element that is a head element of a substitution group; a set of schema elements of the XML schema may define a set of subtypes of the "Address" XML element type; and another set of schema elements of the XML schema may define a set of XML elements as members of the substitution group, where each member is of the "Address" XML element type. As a result, the XML schema becomes very complex because a valid instance of the XML schema (e.g., a specific Purchase Order document) may include a set of XML elements that can be members of the substitution group and at the same time may conform to many different combinations of the "Address" XML element type and the subtypes thereof. The complexity of the XML schema is further exacerbated because this set of XML elements may appear—in the logical hierarchical structure of the instance of the XML schema—under multiple parent XML elements.

As an operational example illustrating the complexity of the above XML schema that describes Purchase Order documents, suppose that a schema processor receives a request that queries whether an XML element of a "mailingAddress" subtype (as defined in Table 3 above) can appear anywhere within a given Purchase Order document. In order to respond to this request, the schema processor would need to determine not only the type ("mailingAddress") of the XML element in question but also the parent XML element type ("Address") as well as any other subtypes of the parent XML element type, any additional subtypes of these subtypes, and each of the members of any substitution groups that include XML elements of the parent XML element type and of any direct or indirect subtypes thereof.

Dependent and Inter-Referenced XML Schemas

The extensive use of dependent and inter-referenced (also referred to as "inter-dependent") XML schemas is another of the causes of the technical challenges for processing industry XML schemas. The ability of an XML schema to reference, include, and incorporate portions of itself (e.g., through recursive declarations) and of other schemas brings another level of complexity to industry XML schemas. A set of typical industry XML schemas (e.g., such as the U.S. GAAP XML schemas) can be interconnected by referencing, incorporating, or including schema elements from other schemas in the set. As used herein, "parent XML schema" refers to an XML schema that includes at least one reference to a schema element that is included in another XML schema, which is referred to herein as a "dependent XML schema." The logical relationship between a parent XML schema and a dependent XML schema may be represented in various relationship constructs that include, but are not limited to, graphs (including graphs that can potentially form cycles) and hierarchical trees.

Since industry XML schemas can be interconnected, and since industry XML schemas can be very complicated due to the nature of the industry data, the mechanisms for processing industry XML schema need to handle not just large XML schemas but also the complex interconnections among such XML schemas. In one example of such complex interconnections, a first XML schema may include a first schema element that references a second schema element in a second XML schema, the second schema element in the second XML schema may reference a third schema element in a third XML schema, and the third schema element in the third XML schema may in turn reference the first schema element in the first XML schema—thus, there would be cycle among the first, second, and third schema elements in the first, second, and third XML schemas.

Technical Challenges in Using Traditional Approaches to Process Industry XML Schemas Traditional approaches for processing an XML schema are too expensive in terms of at least memory usage and CPU processing time when such approaches are used to build in-memory models for a set of interconnected industry XML schemas. The reason for this is that in order to process a particular schema element of an XML schema, a schema processor must at least know the type of the XML element defined in the schema element as well some other XML element characteristics defined in the schema element such as, for example, how many times the XML element can occur (e.g., the MaxOccurs element property) and whether child elements of the XML element need to appear in a particular order (e.g., the sequence property). The traditional approaches for building models of XML schemas involve accessing all the schema elements that occur at the top of an XML schema, and then traversing the links to other schema elements that can occur within each of the top-level schema elements and within any descendants thereof. These traditional approaches have several disadvantages.

One disadvantage is that the traditional approaches cannot share a schema element that occurs under multiple higher level schema elements. This is because in a traditional schema model (e.g., such as a hierarchical Document Object Model (DOM) representation), each higher level schema element must necessarily store all of its children and descendants in order to facilitate a traversal and to ensure the accuracy of such traversal. Thus, such traditional schema model necessarily requires separate data structures to be created for each descendent element of a higher-level schema element even when the higher-level schema element shares descendent elements with some other schema elements. Further, in the traditional approaches for XML schema processing this duplication of memory data structures for shared schema elements is actually deliberately desired in order to allow for easy access and faster traversal of the XML schema. However, such duplication of memory data structures leads to an increased usage of volatile memory that may be prohibitively large for industry XML schemas.

Another disadvantage of the traditional approaches for building XML schema models is that the traditional approaches do not take advantage of and do not even identify any descendent elements are shared among higher level schema elements. This is because each higher level schema element includes (or is associated with) its own memory data structures for storing descendent schema elements. Thus, when building a model of an XML schema, the traditional approaches traverse and separately process each descendent element of a higher level schema element even though that same descendent element may have already been processed as part of processing another higher level schema element. However, such duplicative processing of the same schema element leads to increased CPU processing times that may be prohibitively high for industry XML schemas. To exacerbate this problem, industry XML schemas typically include a large number of repeating schema elements because of the extensive use of substitution groups and of XML element types and subtypes.

As an operational example illustrating the technical challenges in building models for industry XML schemas by using a traditional approach, consider an XML schema that includes a schema element defining an XML element "E1" of XML element type "T1" and a set of sub-elements of the schema element that define nine subtypes, "T11" through "T19", of the "T1" XML element type. Thus, according to this XML schema, any XML element that is of any of subtypes "T11" to "T19" can occur in place of any XML element, such as XML element "E1", that is of the "T1" XML element type. Then, when a model needs to be built for this XML schema, for each schema element that defines an XML element of the "T1" XML element type, the model must include data structures not only for each of the schema elements that define descendents of that XML element but also data structures for all schema sub-elements that define the subtypes derived from the "T1" XML element type (such as subtypes "T11" to "T19"). It is therefore clear that while the traditional approach for building models of XML schemas may work for relatively small schemas, for a complex industry XML schema that includes numerous substitution groups, types and subtypes thereof, the traditional approach quickly leads to an explosion of memory data structures that require a prohibitively large amount of volatile memory to store and a prohibitively high CPU processing times to traverse. This problem is exacerbated by the fact that complex industry XML schemas typically refer to, include, or otherwise incorporate portions (e.g., fragments of schema elements) from multiple other XML schemas. As a result, any use of a traditional approach to build models of industry XML schemas faces serious technical challenges with respect to the enormous amounts of volatile memory and the excessively high CPU processing times that are required to build such models.

Reducing Memory Duplication and Fragmentation

The techniques for processing of complex sets of XML schemas described herein provide efficient and scalable mechanisms for building in-memory models of XML schemas. As used herein, "in-memory model" (also referred to as just "model") of a schema refers to a group of data structures in volatile memory that store schema elements and metadata information that is organized to facilitate efficient processing of instances of the schema. For example, an in-memory model of an XML schema stores metadata information that describes specific properties, characteristics, interrelationships, and dependencies of the XML schema. According to the techniques described herein, an in-memory model of an XML schema may be used to perform encoding and decoding of instances of the XML schema (e.g., such as XML documents that are validated against the schema or are otherwise known to conform to the schema) for purposes of efficient and scalable storing or transmitting of the instances, and/or for purposes of responding to requests for specific schema elements of the XML schema or some metadata information about the XML schema.

As used herein, "building" (also referred to herein as "compiling") an in-memory model of a schema refers to generating an in-memory model that is in accordance with the techniques described herein. It is noted that, as described herein, an in-memory model of a schema is different than a traditional DOM model of a schema, and using the in-memory model of a schema is different than using a traditional DOM model of a schema to validate against the schema an XML document and/or the XML elements therein.

For example, according to the techniques described herein, in some embodiments an in-memory model of a schema is used to encode an instance (e.g., such as an XML document) of the schema. One way of encoding an XML document (which has already been validated against a schema or is otherwise known to conform to the schema) is to use opcodes based on the in-memory model of the schema. For example, if based on the in-memory model of the schema it is determined that only one top-level element is present in a given XML document, then a 2-byte label/opcode "element start" can be stored in an encoding of the XML document instead of writing out the entire top-level element in the encoding. Then, if based on the in-memory model of the schema it is determined that a given element in the XML document includes child elements E1 to E5 and that all these child elements always occur in a sequence, then these child elements can be serialized one after the other in the encoding of the XML document without storing in the encoding the XML tags of these child elements. In this manner, the XML document can be efficiently encoded by using knowledge that is derived from the in-memory model of the schema to which the XML document conforms.

In another example, according to the techniques described herein, in some embodiments an in-memory model of a schema is used to optimize the processing of instances (e.g., such as XML documents) of the schema. One type of such processing includes evaluating queries against stored XML documents that are encoded by using an in-memory schema model as described herein. For example, the following XPath query:

"\PurchaseOrder\\address"

may be evaluated against the in-memory model of a given "PurchaseOrder" schema to find whether any "Purchase Order" XML document that conforms to the schema includes any "address" XML elements. By using the in-memory model of the "PurchaseOrder" schema, the above XPath query can be evaluated to find out the location paths (if any) to any "address" XML elements without actually traversing the "PurchaseOrder" schema or any particular instance thereof. The techniques described herein allow for this because the in-memory model of the schema is built in such a way that it contains sufficient information that describes the structure of the represented XML schema—thus, the location paths to any "address" XML elements can be efficiently determined along with any properties and the characteristics of these paths (e.g., such as the characteristic that an "address" XML element is the second element under a "billing" XML element in a "PurchaseOrder" XML document and the third element under a "shipping" XML element in that XML document.)

Functional Description of an Example Embodiment

FIG. 1 is a flow diagram that illustrates an example method for building an in-memory model of an XML schema according to the techniques described herein. In some embodiments, the steps of the method illustrated in FIG. 1 are performed by a schema processor that is executed by one or more computing devices. As used herein, "schema processor" refers to logic that is operable at least to build in-memory schema models of schemas in accordance with the techniques described herein. It is noted, however, that the use of a schema processor in the description of FIG. 1 is for illustrative purposes only, and the example method illustrated in FIG. 1 is not limited to being performed by any particular type of computer process entity or server.

As part of building the in-memory model of an XML schema, in step 102 a schema processor initializes, within one or more memory blocks that have been pre-allocated in volatile memory, a hash table and an array for storing a particular set of schema elements from the XML schema. The particular set of schema elements can include all schema elements that define XML element types in the XML schema, where each of the XML element types has one or more subtypes; in this case, the initialized hash table is a "type" hash table and the array is a "type" array, where the "type" hash table and the "type" array are configured to provide efficient storage within the in-memory model of all schema elements in the XML schema that store XML element types and the subtypes thereof. Alternatively, the particular set of schema elements can include all schema elements that define substitution groups in the XML schema; in this case, the initialized hash table is a "substitution group" hash table and the array is a "substitution group" array, where the "substitution group" hash table and the "substitution group" array are configured to provide efficient storage within the in-memory model of all schema elements in the XML schema that define substitution groups and members thereof. In other words, by using the same mechanism, in step 102 the schema processor can initialize one or both of: one set of data structures (e.g., "type" hash table and "type" array) for storing all schema elements that define XML element types and subtypes thereof in the XML schema; and one set of data structures (e.g., "substitution group" hash table and "substitution group" array) for storing schema elements that define substitution groups and members thereof in the XML schema.

After initializing the corresponding (e.g., "type" or "substitution group") hash table and array for the particular set of schema elements, in step 104 the schema processor accesses each schema element from the particular set and stores that schema element as part of the in-memory model of the XML schema. For example, as part of step 104, the schema processor may perform steps 106 to 112 for the schema element that is currently being processed.

In step 106, the schema processor accesses (and retrieves from the XML schema, if necessary) the schema element being processed and the sub-elements thereof. For example, if the schema element is a parent element that defines an XML element type that has subtypes, then the sub-elements are those schema elements that define the subtypes of that XML element type. If the schema element is a head element that defines a substitution group, then the sub-elements are those schema elements that define members of that substitution group.

In step 108, the schema processor stores the sub-elements as separate entries into a first portion of the corresponding array. For example, if the schema element being processed is a parent element, then the sub-elements of the parent element would be stored as entries in the first portion of the "type" array. If the schema element being processed is a head element, then the sub-elements of the head element would be stored as entries in the first portion of the "substitution group" array.

In step 110, the schema processor stores into a second portion of the array pointers or other indications that respectively reference the entries in the first portion of the array that store the sub-elements of the schema element that is being processed. For example, if the schema element being processed is a parent element, then the second portion of the "type" array would store pointers or indications to the entries of the first portion of the array that store the sub-elements of the parent element. If the schema element being processed is a head element, then the second portion of the "substitution group" array would store pointers or indications to the entries of the first portion of the array that store the sub-elements of the head element.

In step 112, the schema processor stores one or more entries into the corresponding hash table by using an identifier of the schema element being processed as a hash key, where the one or more entries in the hash table indicate one or more of the pointers or indications stored in the second portion of the corresponding array. For example, if the schema element being processed is a parent element, then the schema processor would store one or more entries in the "type" hash table, where each hash table entry would use an identifier of the parent element as a key and would store a value that indicates one or more pointers stored in the second portion of the "type" array. If the schema element being processed is a head element, then the schema processor would store one or more entries in the "substitution group" hash table, where each hash table entry would use an identifier of the head element as a key and would store a value that indicates one or more pointers stored in the second portion of the "substitution group" array.

In step 114, the schema processor determines whether there are any more schema elements left for processing in the particular set of schema elements determined in step 104. If there are more schema elements from the particular set that need to be processed, the schema processor proceeds to perform steps 106, 108, 110, and 112 for each schema element that remains to be processed. If in step 114 the schema processor determines that there are no more schema elements left for processing, then the schema processor continues in step 116 with other processing that is involved in building the in-memory model of the XML schema.

It is noted that the above-described sequence, in which the steps of the method in FIG. 1 are performed, is provided for illustrative purposes only. For example, while step 104 describes determining a particular set of schema elements (e.g., all schema elements that define substitution groups or XML element types with subtypes), an implementation of the method does not necessarily need to determine all schema elements that participate in the set at the same time. For example, in some embodiments the schema processor can build an in-memory model of an XML schema by iteratively processing the schema elements included in the XML schema (e.g., as described above with respect to step 120). In these embodiments, when the schema processor encounters a parent element for the first time, the schema processor initializes the "type" hash table and the "type" array (e.g., as indicated in step 102) and then stores the parent element and the sub-elements thereof as part of the in-memory model (e.g., as described above with respect to steps 106 to 112); thereafter, whenever the schema processor encounters a subsequent parent element, the schema processor stores this subsequent parent element and the sub-elements thereof in the "type" hash table and the "type" array in the manner described above with respect to steps 106, 108, 110, and 112. Similarly, when the schema processor encounters a head element for the first time, the schema processor initializes the "substitution group" hash table and the "substitution group" array (e.g., as indicated in step 102) and then stores the head element and the sub-elements thereof as part of the in-memory model (e.g., as described above with respect to steps 106 to 112); thereafter, whenever the schema processor encounters a subsequent head element, the schema processor stores this subsequent head element and the sub-elements thereof in the "substitution group" hash table and the "substitution group" array in the manner described above with respect to steps 106, 108, 110, and 112.

In this manner, the techniques described herein provide for building an in-memory model of an XML schema by storing repeating schema elements (e.g., such as schema elements that define substitution groups and XML element types with subtypes) in a set of structures (e.g., hash table and array) that are separate from the structures that store the parents of these schema elements. This allows the techniques described herein to reduce the amount of memory necessary for storing the in-memory model by avoiding memory duplication (e.g., at least because multiple copies of the same repeating schema elements are not stored with or under multiple different parents), while at the same time providing for efficient processing of schema-based operations that use the in-memory model (e.g., at least because the data structures, which are used for storing schema elements that define substitution groups and XML element types with subtypes, are configured to facilitate fast memory access).

Structural Description of an Example Embodiment

Figure 2:
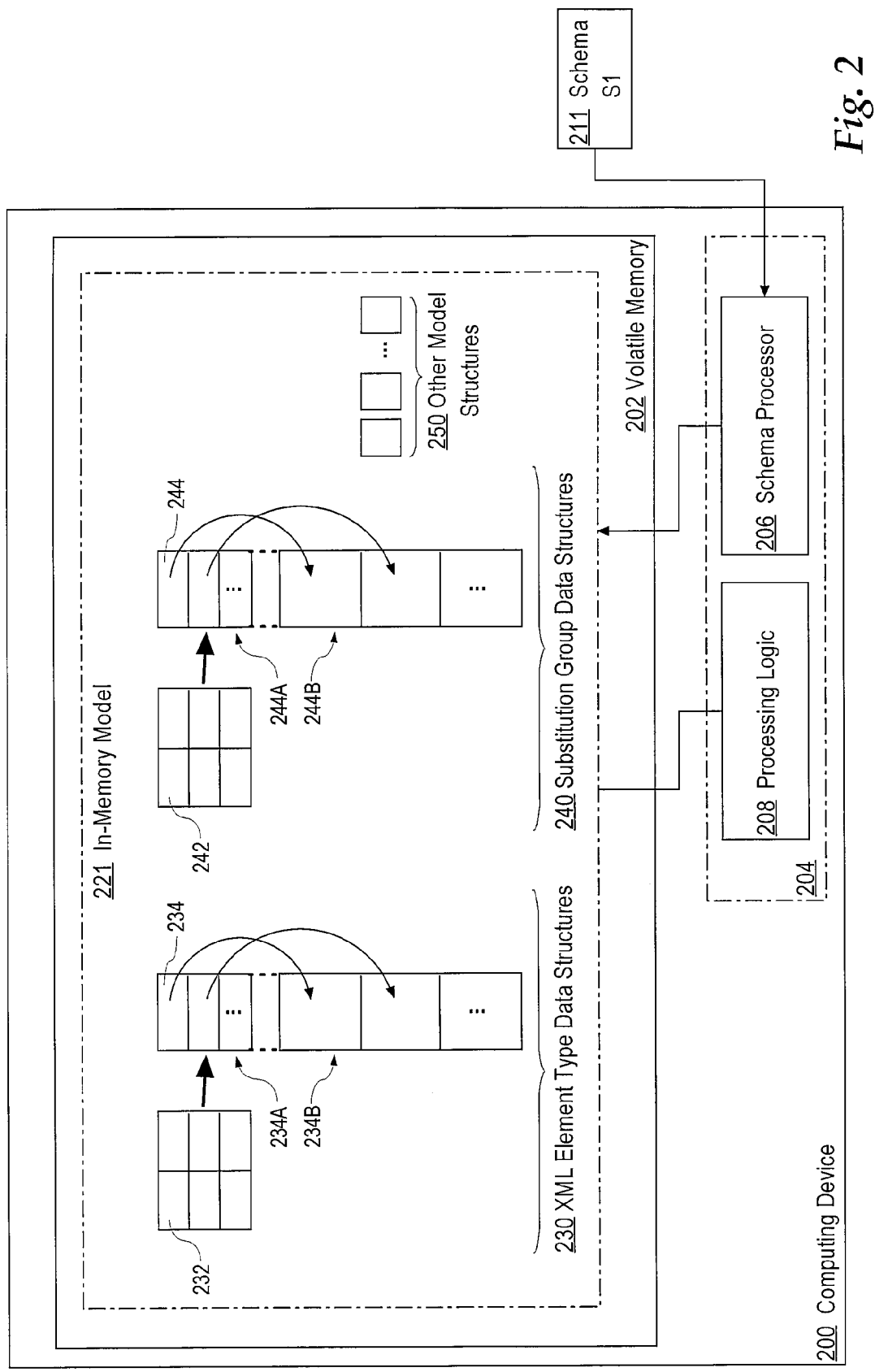
FIG. 2 a block diagram that illustrates example data structures for an in-memory model of an XML Schema according to one embodiment.

FIG. 2 is a block diagram that illustrates the data structures for an in-memory model of an XML Schema that are built in accordance with an example embodiment of the techniques described herein.

Computing device 200 comprises volatile memory 202 that is coupled to one or more hardware processors such as central processing units (CPUs). Computing device 200 is configured and operable to execute program logic 204 as a computer process. As used herein, "logic" refers to a set of instructions which, when executed by one or more processors, are operable to perform one or more functionalities. In various embodiments and implementations, any such logic may be implemented as one or more software components that are executable by one or more processors, as one or more hardware components such as Application-Specific Integrated Circuits (ASICs) or other programmable Integrated Circuits (ICs), or as any combination of software and hardware components.

In some embodiments, logic 204 may be a server operable to process XML schemas and to perform schema-based operations. Examples of logic 204 include, but are not limited to, database servers, web servers, application servers, standalone programs, query processors executing on middleware platforms, and various client and/or client-server applications that provide for processing of XML schemas and/or for processing of schema-based operations against XML data. As used herein, "server" refers to one or more software components which, when executed, may be allocated computational resources, such as memory, CPU time, and/or disk storage space in order to perform one or more functionalities. "Database server" refers to a server that is operable to perform various functionalities against one or more databases that may include, without limitation, relational databases, object databases, object-relational databases, various kinds of XML data repositories, and any combinations thereof. For example, by utilizing its allocated resources, a database server may be operable to perform various data management functions (including, but not limited to, controlling and facilitating access to particular databases, processing queries from and/or requests by clients to access particular databases, and processing requests and/or queries by clients to add, delete, or modify data in particular databases), as well as database management functions (including, but not limited to, creating databases and tables, allocating disk space for databases and tables, and creating and maintaining user login information, role information, and security policy information). In clustered operational environments, a database server may be a server instance that operates as part of a database server cluster that is operable to perform data management functions and database management functions against one or more databases.

Logic 204 comprises schema processor 206 and processing logic 208. Schema processor 206 is logic that is operable at least to build in-memory schema models of schemas in accordance with the techniques described herein. Processing logic 208 is logic that is operable to perform schema-based operations that use, refer, or otherwise access the in-memory schema models build by schema processor 206. In various embodiments, schema processor 206 and processing logic 208 may be implemented, without limitation, as one or more software modules, as one or more libraries of functions, as one or more dynamically linked libraries, and as a standalone or a client-server software application. In some embodiments, logic 204, schema processor 206, and processing logic 208 may be implemented as one integrated component that may perform additional functionalities or as separate components or modules.

In operation, schema processor 206 receives, retrieves, or otherwise accesses XML schemas such as, for example, XML schema 211. In accordance with the techniques described herein, schema processor 206 builds (or compiles) in-memory model 221 for schema 211.

As part of building in-memory model 221, schema processor 206 initializes in pre-allocated memory blocks data structures 230, data structures 240, and data structures 250. Data structures 230 are configured for storing all schema elements of schema 211 that define XML element types and any subtypes thereof. Data structures 240 are configured for storing all schema elements of schema 211 that define substitution groups and members thereof. Data structures 250 are configured for storing or otherwise representing other schema elements of schema 211 that may include, but are not limited to, schema elements that define "simple" XML element types, schema elements that define "complex" XML elements types that do not have subtypes, and schema elements that do not define members of substitution groups. In some implementations, schema processor 206 iterates through or otherwise traverses schema 211 and builds the appropriate ones of data structures 230, 240, and 250 for each encountered schema element.

Data structures 230 include "type" hash table 232 and "type" array 234. (As used herein, "array" refers generally and broadly to a data structure that includes entries which are separately identifiable and separately accessible in the data structure.) Schema processor 206 initializes data structures 230 when it first encounters a schema element that is a parent element defining an XML element type that has subtypes. To initialize hash table 232 and array 234, schema processor 206 may perform two passes over schema 211. In the first pass, schema processor 206 goes over the schema elements that define XML element types with subtypes, determines the total number of schema elements that define XML element types and subtypes, and calculates the total amount of memory that would be required for all the parent elements defining XML element types and all the sub-elements defining subtypes of the XML element types. In the second pass schema processor 206 initializes, within one or more preallocated memory blocks, hash table 232 and array 234 based on the total number of schema elements that define XML element types and subtypes and on the calculated total amount of memory that would be required for these schema elements. Schema processor 206 divides array 234 into portions 234A and 234B. Portion 234B is configured as entries that are operable to store schema elements that define XML element types and subtypes thereof, where the number of entries in portion 234B is sufficient to store all schema elements of schema 211 that define XML element types and the subtypes thereof. Portion 234A is configured as entries that are operable to store pointers to the entries in portion 234B, where each pointer stored in an entry of portion 234A points to the starting location of the corresponding entry in portion 234B. Schema processor 206 initializes hash table 232 with entries that are configured to include a hash key, which is based on or is derivable from an identifier of a schema element, and a value that can reference one or more entries in portion 234A of array 234.

Data structures 240 include "substitution group" hash table 242 and "substitution group" array 244. Schema processor 206 initializes data structures 240 when it first encounters a schema element that is a head element defining a substitution group and/or members thereof. To initialize hash table 242 and array 244, schema processor 206 may perform two passes over schema 211. In the first pass, schema processor 206 goes over the schema elements that define substitution groups and members thereof, determines the total number of schema elements that define the substitution groups and the members thereof, and calculates the total amount of memory that would be required for all the head elements that define substitution groups and all the sub-elements that define members of the substitution groups. In the second pass schema processor 206 initializes, within one or more pre-allocated memory blocks, hash table 242 and array 244 based on the total number of schema elements that define substitution group members and on the calculated total amount of memory that would be required for these schema elements. Schema processor 206 divides array 244 into portions 244A and 244B. Portion 244B is configured as entries that are operable to store schema elements that define substitution groups and members thereof, where the number of entries in portion 244B is sufficient to store all schema elements of schema 211 that define substitution groups and members thereof. Portion 244A is configured as entries that are operable to store pointers to the entries in portion 244B, where each pointer stored in an entry of portion 244A points to the starting location of the corresponding entry in portion 244B. Schema processor 206 initializes hash table 242 with entries that are configured to include a hash key, which is based on or is derivable from an identifier of a schema element, and a value that can reference one or more entries in portion 244A of array 244.

Data structures 250 include memory structures that are configured to store schema elements of schema 211. Examples of data structures 250 include, without limitation, trees, lists, tables, etc. In various implementations, schema processor 206 can arrange data structures 250 in accordance with various organizations that are suitable to represent the overall model of schema 211; examples of such organizations include, but are not limited to, trees, graphs, tables, arrays, lists, etc. In some implementations, data structures 250 may be organized as a tree of nodes, where each node represents a schema element of schema 211. In these implementations, instead of storing the actual schema elements that define members of substitution groups and XML element types and subtypes, the nodes representing these schema elements store only unique identifiers that can be used to perform lookups into hash table 232 (to determine schema elements the define XML element types and subtypes thereof) and hash table 242 (to determine schema elements that define members of substitution groups).

To process a given schema element, schema processor 206 receives, retrieves, or otherwise accesses that schema element in XML schema 211. Schema processor 206 then determines whether the schema element defines a member of a substitution group or an XML element type or subtype thereof. If the schema element is neither, schema processor 206 stores the schema element in data structures 250.

If schema processor 206 determines that the schema element defines an XML element type or a subtype, schema processor 206 stores the schema element in an entry in portion 234B of array 234, and also stores a pointer to that entry of portion 234B into an entry in portion 234A of array 234. Schema processor 206 then initializes one or more entries in hash table 232 based on the identifier of the schema element, where the one more entries in hash table 232 store pointer(s) or other reference(s) that point to the entry in portion 234A of array 234. In some embodiments, the identifier of the schema element may be an identifier that uniquely identifies the schema element among all the schema elements in schema 211. One example of such unique identifier is a Qualified Name (QName) identifier that is used in an encoded storage format according to which schema 211 is stored. (For example, when an XML schema such as schema 211 is physically stored in persistent storage, QName identifiers are used in the storage to identify the tag names and attribute names of schema elements instead of using the actual tag names and attribute names specified in the XML schema. To facilitate this storage format, a system implementing the storage format may store in a system-wide repository some mapping or encoding that associates the QName identifiers with the corresponding properties (e.g., tag names, attribute names, etc.) of the schema elements in the XML schemas that are stored by the system.)

If schema processor 206 determines that the schema element defines a member of a substitution group, schema processor 206 stores the schema element in an entry in portion 244B of array 244, and also stores a pointer to that entry of portion 244B into an entry in portion 244A of array 244. Schema processor 206 then initializes one or more entries in hash table 242 based on the identifier of the schema element, where the one more entries in hash table 242 store pointer(s) or other reference(s) that point to the entry in portion 244A of array 244. In some embodiments, the identifier of the schema element may be an identifier that uniquely identifies the schema element among all the schema elements in schema 211, such as, for example, a QName identifier.

By processing each schema element of schema 211 in the above manner, schema processor 206 builds (compiles) in-memory model 221 for schema 211 in accordance with the techniques described herein.

After in-memory model 221 of schema 211 is built, processing logic 208 can process schema-based operations against in-memory model 221. For example, processing logic 208 may be invoked to perform (or may otherwise receive for performing) an operation which requires access to a particular schema element that defines a subtype of an XML element type. According to the techniques described herein, processing logic 208 is operable to retrieve the particular schema element without performing a traversal of schema 211 (or of an in-memory representation of schema 211) to determine the location of that particular schema element. Instead, processing logic 208 uses the identifier of the particular element to perform a lookup into hash table 232. The lookup returns a reference to an entry in portion 234A of array 234, and processing logic 208 uses the returned reference to access that entry in portion 234A. By using the pointer stored in that entry, processing logic 208 locates the entry in portion 234B of array 234 that stores the particular schema element, and extracts or otherwise accesses the particular schema element stored therein.

In another example, processing logic 208 may be invoked to perform (or may otherwise receive for performing) an operation which requires access to a particular schema element that defines a member of a substitution group in schema 211. In accordance with the techniques described herein, processing logic 208 retrieves the particular schema element without performing a traversal of schema 211 (or of an in-memory representation of schema 211) in a manner that is similar to the way the processing logic accesses schema elements stored in data structures 230. For example, processing logic 208 uses the identifier of the particular schema element to perform a lookup into hash table 242 in order to determine a corresponding entry in portion 244A of array 244. Processing logic 208 then retrieves the pointer stored in the corresponding entry of portion 244A, and uses the retrieved pointer to locate and access that one entry in portion 244B of array 244 which stores the particular schema element.

Memory Allocation

In one embodiment, the techniques described herein provide for reducing memory fragmentation by pre-allocating, in volatile memory, memory blocks for storing an in-memory model of an XML schema, where the memory blocks each have an equal size that is large enough to store multiple schema elements of the XML schema. Instead of allocating separate memory blocks for the separate pieces or portions of the XML schema, the techniques described herein provide for initializing the data structures of the in-memory model within one or more memory blocks that have already been pre-allocated in volatile memory by the schema processor or by other logic that is building the in-memory model. In some implementations, each memory block is a heap and the size of the heap is such that the heap can store multiple schema elements of an XML schema, where one or more of the multiple schema elements may be schema elements that are included in a dependent XML schema that is referenced by or otherwise incorporated in the XML schema. (As used herein, "heap" refers to an individually allocatable and individually freeable chunk of memory.)

In some traditional approaches for generating in-memory schema representations, each separately identifiable piece or portion of an XML schema is stored in a separate individual heap. Creating and maintaining a heap, however, involves a lot of overhead because each individual heap has individual metadata that needs to be maintained and each individual heap needs to be separately allocated, addressed, and accessed.

What the traditional approaches for generating in-memory schema representations do not recognize, however, is that when an in-memory model for a first XML schema (S1) is being built, there actually is no need to allocate a separate heap or heaps for schema pieces or portions that come from a dependent XML schema (S2). With that insight and in contrast to the traditional approaches, the techniques described herein provide for storing the pieces or portions from the dependent XML schema S2 in memory blocks that have already been allocated for the in-memory model of XML schema S1. For example, according to the techniques described herein, the pieces or portions of dependent XML schema S2 are stored in the same contiguous memory block or blocks (e.g., such as heap or heaps) into which data structures have already been initialized for the schema elements of XML schema S1. In this manner, the techniques described herein achieve at least two benefits: (1) reduce the number of memory allocations (e.g., the number of allocated heaps) and the maintenance overhead associated therewith because memory blocks of larger sizes can be allocated for the in-memory schema model; and (2) reduce the internal fragmentation by initializing memory piece-wise (e.g., data structure entries), within the large memory blocks of the in-memory schema model, to have the exact sizes of the pieces or portions that come from dependent XML schemas.

Considering the above XML schema S1 and dependent XML schema S2 as an illustration, a traditional approach for generating in-memory schema representations would typically allocate separate heaps of 4 KB (4,096 bytes) to store each separate piece or portion of dependent XML schema S2 that needs to be included in the in-memory model of XML schema S1. In contrast, according to the techniques described herein, memory blocks of 32 KB (32,768 bytes) or even larger can be allocated because the techniques described herein provide that multiple schema elements from dependent XML schema S2 (e.g., such as dependent schema elements that define substitution group members and/or XML element types and subtypes) can be stored in the same data structures (e.g., such as "type" and "substitution group" arrays and hash tables) that have already been initialized for the in-memory model of XML schema S1. For example, in order to store a schema element from dependent XML schema S2 in the in-memory model of XML schema S1, a schema processor calculates the size of that schema element and allocates a data structure entry, within the 32 KB memory block, that has the exact size of that schema element. Thus, the techniques described herein reduce both the internal memory fragmentation (because the schema elements from dependent XML schema S2 occupy memory that is equal to their exact sizes) and the external memory fragmentation (because larger memory blocks are used which reduces the total number of memory blocks).

In this manner, the techniques described herein reduce the total amount of memory that is used for an in-memory schema model and also reduce the number of memory block allocations, which in turn reduces the CPU time and computing resources that are expended to build the in-memory schema model. These benefits of the techniques described herein are especially useful and noticeable in building in-memory models of complex XML schemas at least because: (1) when building an in-memory model of a complex XML schema, a large amount of CPU time and computing resources are spent to allocate, initialize, and maintain the memory blocks for the in-memory model and the data structures included therein; and (2) a complex XML schema usually references a number of dependent XML schema and tends to include a large number of substitution groups and XML element types with subtypes, which complicates the building and the processing of the in-memory model because numerous memory blocks need to be allocated and/or otherwise accessed for the dependent schema elements, substitution group members, and XML element types or subtypes.

Examples of Processing Operations and Functions

After an in-memory model of a schema is built in accordance with the techniques described herein, various schema-based operations may be efficiently performed by using the in-memory model. For example, in some embodiments the in-memory model of an XML schema is associated with a set of XML documents that were previously validated against the XML schema; thus, in these embodiments the in-memory model of the XML schema may be used to perform various operations and functionalities that are based on metadata information of the XML documents and/or on the XML documents themselves.

According to the techniques described herein, an in-memory model of an XML schema may be used to perform encoding and decoding of instances of the XML schema (e.g., such as XML documents that are validated against the schema or are otherwise known to conform to the schema) for purposes of efficient and scalable storing or transmitting of the instances, and/or for purposes of responding to requests or queries for specific schema elements of the XML schema or some metadata information about the XML schema.

For example, in some embodiments an in-memory model of an XML schema is used to encode an XML document, which conforms to the XML schema, into encoded XML data. The encoded XML data may be stored in volatile memory or in persistent storage as a representation of the XML document. Alternatively, or in addition to, the encoded XML data may be transferred from one component of a system to another—for example, a query processor in a database server may transfer the encoded XML data that represents an XML document to a server component that is configured to transfer the encoded XML data to another database system over a network.

As used herein, "encoded XML data" refers to a set of data that stores the content and the properties (e.g., attributes, order of elements, etc.) of an XML document and the XML elements therein into a format that is different than a well-formatted XML representation (e.g., such as XML 1.0 format) of the XML document. Encoded XML data may be represented in a storage format which, instead of using XML tags, uses opcodes, labels, and/or other identifiers that are derived from, or otherwise based on, the in-memory model of the XML schema. One example of such storage format is a binary-encoded format that uses QName identifiers to identify XML element properties (e.g., such as tag names, attribute names, etc.).

In some embodiments, an in-memory model of an XML schema is used to decode encoded XML data into an XML document that conforms to the XML schema. For example, a database server component may receive the encoded XML data from another component (e.g., such as query processor), may use the in-memory schema model to decode the XML data and to generate a well-formatted XML document, and to send the XML document for rendering or storing at a database client that requested the document. In another example, a database server component may retrieve the encoded XML data from persistent storage (e.g., such as database stored on one or more storage devices), and may use the in-memory schema model to decode the XML data and to generate a well-formatted XML document that may be needed by another database server component.

In some embodiments, an in-memory model of an XML schema is used to evaluate queries against stored XML documents that conform to the XML schema, where the XML documents may or may not be encoded based on the in-memory model. For example, an XPath query can be evaluated against the in-memory model of a given XML schema in order to find whether a particular XML element specified in the query can occur in any XML documents that conform to the given XML schema. By providing that such XPath queries can be evaluated against the in-memory model of the XML schema, the techniques described herein allow the XPath queries to be evaluated without actually traversing the given XML schema or any particular XML document that conforms thereto.

In some embodiments, a system may be configured to perform one or more schema-based operations against an in-memory model of an XML schema that is built according to the techniques described herein, where the one or more operations do not include a validation operation that validates an XML document against the in-memory model. In other words, in these embodiments the in-memory model of the XML schema is not used for validating XML documents; rather, these embodiments may provide a separate conventional model (e.g., such as a DOM model) of the XML schema that is used to validate XML documents.

It is noted that in different implementations and operational contexts, a variety of schema-based operations and functionalities may be performed against an in-memory model of an XML schema that is built in accordance with the techniques described herein. Thus, the schema-based operations and functionalities described in this section are to be regarded in an illustrative rather than a restrictive sense.

Pre-Processing of Dependent Schemas

Some traditional approaches for generating in-memory schema representations process dependent XML schemas in the following way. When the in-memory model of a parent XML schema is being built, each dependent XML schema is loaded in memory in its entirety and is traversed for each XML element type and substitution group that is referenced by the parent XML schema. Thus, these traditional approaches have at least two disadvantages. First, as dependent XML schemas grow larger and larger (for example XML schemas that are part of an industry standard), processing dependent XML schemas expends more and more volatile memory and CPU time. Second, since XML schemas (e.g., such as industry XML schemas) are increasingly becoming more and more complex and interconnected, a dependent XML schema may reference several dependent XML schemas which in turn may reference or incorporate yet other XML schemas; this, however, further exacerbates the first disadvantage by requiring even more volatile memory and CPU time.

In order to avoid the above disadvantages of traditional approaches, the techniques described herein provide for faster and more efficient generation of an in-memory model of an XML schema by pre-loading, in data structures on persistent storage, of schema elements from dependent XML schemas that are referenced, included, and/or incorporated by the XML schema. For example, the techniques described herein provide for storing schema elements from dependent XML schemas in data structures on persistent storage, where the schema elements may include: parent elements that define XML element types, and sub-elements of the parent elements that define subtypes of the XML element types; and/or head elements that define substitution groups, and sub-elements of the head elements that define members of the substitution groups. Then, when an in-memory model is being built of an XML schema that references one or more dependent XML schema(s), only those dependent schema elements which are referenced by the XML schema are retrieved from the data structures on persistent storage and are included in the in-memory model of the XML schema. Thus, whereas the traditional approaches require loading in memory and traversing an entire dependent XML schema, the techniques described herein provide for identifying and pre-processing into persistent data structures only those specific dependent schema elements that are actually needed in the in-memory model of a given XML schema. In this way, the techniques described herein provide for building an in-memory model of an XML schema without loading into volatile memory and without traversing any dependent XML schemas that are referenced in the XML schema.

Figure 3:
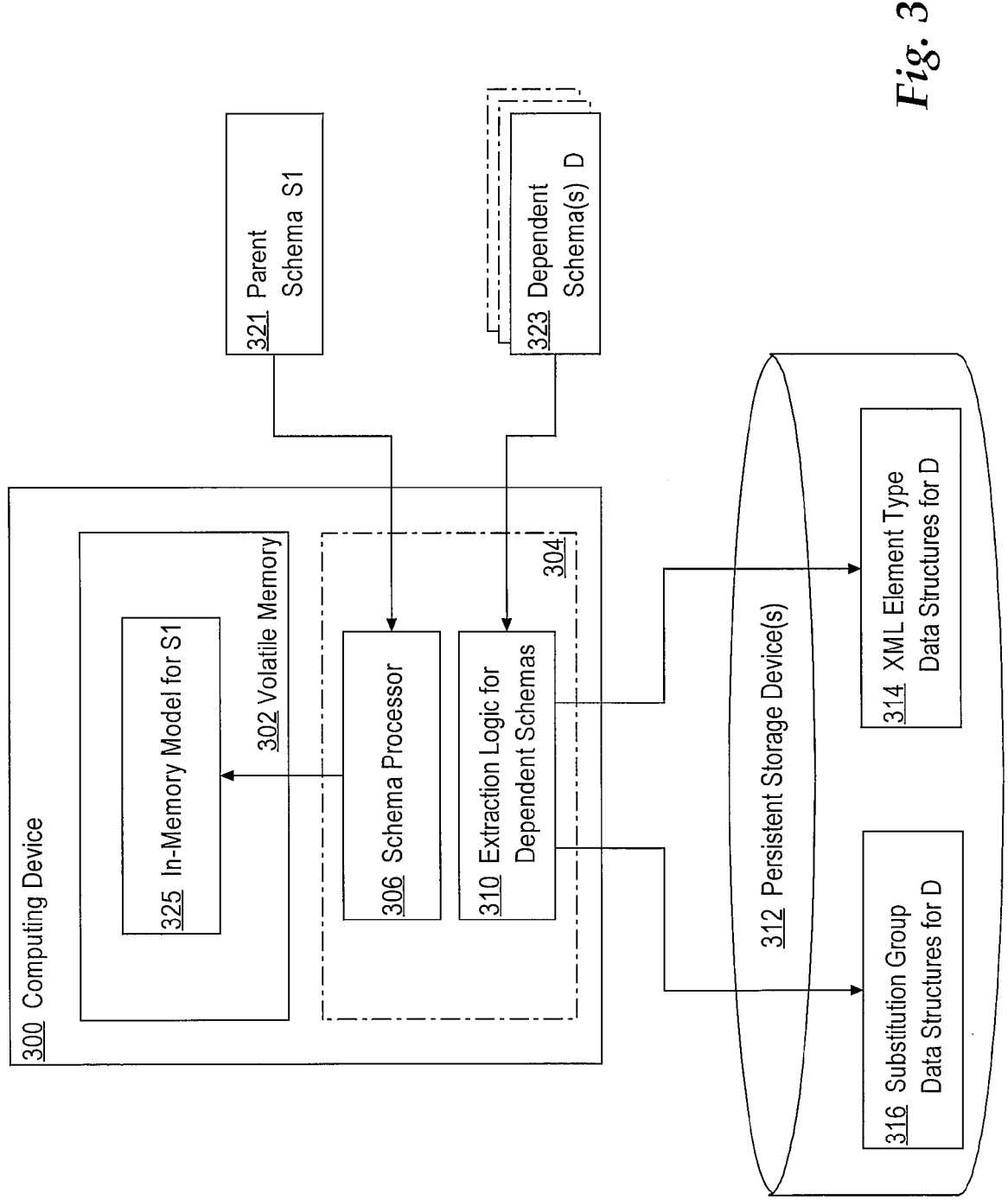
FIG. 3 is a block diagram that illustrates an example system for generating an in-memory model of an XML Schema that references one or more dependent XML schemas according to one embodiment.

FIG. 3 is a block diagram that illustrates an example system for generating an in-memory model of an XML Schema that references one or more dependent XML schemas. Computing device 300 comprises volatile memory 302 that is coupled to one or more hardware processors (e.g., such as CPUs) and to persistent storage device(s) 312.

Computing device 300 is configured and operable to execute program logic 304 as a computer process. In some embodiments, logic 304 may be a server operable to process XML schemas and to perform various schema-based operations. Examples of logic 304 include, but are not limited to, database servers, web servers, application servers, standalone programs, query processors executing on middleware platforms, and various client and/or client-server applications that provide for processing of XML schemas and/or for processing of schema-based operations against XML data.

Logic 304 comprises schema processor 306 and extraction logic 310. Schema processor 306 is logic that is operable at least to build in-memory schema models of schemas in accordance with the techniques described herein. Extraction logic 310 is logic that is operable to process (or compile) schema elements from dependent schemas and to store the processed (or compiled) dependent schema elements in data structures on persistent storage device(s) 312. In various embodiments, schema processor 306 and extraction logic 310 may be implemented, without limitation, as one or more software modules, as one or more libraries of functions, as one or more dynamically linked libraries, and as standalone or client-server software application. In some embodiments, logic 304, schema processor 306, and extraction logic 310 may be implemented as one integrated component that may perform additional functionalities or as separate components or modules.

Data structures 314 and 316 are also referred to as "processed" or "compiled" data structures. According to the techniques described herein, data structures 314 and 316 are configured in such way that any given dependent schema element can be separately retrieved based on its schema element identifier and loaded into volatile memory 302.

In some embodiments, data structures 314 and 316 may be configured and built as B-tree index structures, where the key to each structure is a schema element identifier such as, for example, a QName identifier. As illustrated in FIG. 3, data structures 314 and 316 may be system-wide structures configured for storing dependent schema elements for any number of XML schemas for which computing device 300 would build in-memory models; alternatively, data structures 314 and 316 may be schema-specific structures that are configured to store dependent schema elements for a specific XML schema. In operation, when schema processor 306 is building an in-memory model of an XML schema, the schema processor uses a schema element identifier (e.g., a QName identifier) from the XML schema to perform a lookup into one or more of data structures 314 and 316, and the lookup returns all the dependent schema elements and sub-elements thereof that match that schema element identifier. In this manner, the techniques described herein provide for loading into volatile memory 302 only those dependent schema elements that are actually needed for the in-memory model that is being built.

According to the techniques described herein, data structure 314 is configured for storing all parent elements, from dependent XML schemas, that define XML element types with subtypes and the sub-elements of the parent elements that define subtypes of the XML element types. Data structure 316 is configured for storing all head elements, from dependent XML schemas, that indicate substitution groups and the sub-elements of the head elements that define members of the substitution groups. In some embodiments, persistent storage device(s) 312 may further include data structures (not shown in FIG. 3) that are configured for storing other types of dependent schema elements including, but not limited to, dependent schema elements that define "simple" XML element types, dependent schema elements that define "complex" XML elements types that do not have subtypes, and dependent schema elements that define various XML elements that are not members of substitution groups. It is noted that according to the techniques described herein, the data structures (e.g., such as data structures 314 and 316) on persistent storage are not limited to storing schema elements only from one particular dependent schema; rather, the data structures on persistent storage may store schema elements from multiple dependent schemas (which may further be inter-dependent) so long as each dependent schema element is uniquely identifiable (e.g., by a unique, system-wide QName identifier).

In an operational example, parent XML schema 321 references one or more dependent XML schema(s) 323. That is, schema 321 includes, references, incorporates, or otherwise refers (directly or indirectly) to one or more schema elements in dependent schema(s) 323. Prior to building an in-memory model for schema 321, extraction logic 310 processes dependent schema(s) 323 in accordance with the techniques described herein to extract and store dependent schema elements in data structures 314 and 316, which are stored on persistent storage device(s) 312.

For example, to process the dependent schema elements for schema 321, extraction logic 310 traverses schema 321 and identifies all dependent schema elements that reside in dependent schema(s) 323. Then, for each identified dependent schema element, extraction logic 310 traverses the corresponding dependent schema(s) 323 and extracts that dependent schema element. Prior to, during, or after, extracting a dependent schema element, extraction logic 310 also determines whether the dependent schema element defines a member of a substitution group or an XML element type or subtype thereof. If extraction logic 310 determines that the dependent schema element defines an XML element type or a subtype, extraction logic 310 stores the dependent schema element in data structures 314. If extraction logic 310 determines that the extracted schema element defines a member of a substitution group, extraction logic 310 stores the dependent schema element in data structures 316. In embodiments which provide persistent data structures configured for storing other types of dependent schema elements (e.g., other than dependent schema elements that define substitution groups and XML elements with subtypes), the extraction logic 310 may store such other dependent schema elements in the persistent data structure(s) that correspond to their types. In this manner, extraction logic 310 efficiently processes dependent schema(s) 323 without loading into volatile memory the entire dependent schemas or any other schemas that may be depending therefrom.

After extraction logic 310 has pre-processed dependent schema(s) 323 in the above manner, schema processor 306 can build in-memory model 325 of schema 321 in accordance with the techniques described herein. For example, schema processor 306 receives a request or is otherwise invoked to build (or compile) in-memory model 325. Schema processor 306 retrieves, or otherwise accesses, the schema elements in schema 321.

To process a given schema element, schema processor 306 receives or otherwise retrieves that schema element. If schema processor 306 determines that the schema element is defined in schema 321, the schema processor retrieves that schema element from schema 321. If schema processor 306 determines that the schema element being processed is defined in dependent schema(s) 323, the schema processor uses the identifier of that schema element to perform a look-up in data structure 314 (if that schema element defines an XML element type or subtype thereof) or in data structure 316 (if that schema element defines a member of a substitution group), and the look-up returns that schema element and any sub-elements thereof from data structures 314 and/or 316 that match the same identifier. In this manner, schema processor 306 identifies and retrieves, from persistent storage device(s) 312, only those schema elements and sub-elements thereof from dependent schema(s) 323 that actually need to be included in in-memory model 325. Further, schema processor 306 builds in-memory model 325 without loading into volatile memory any dependent schema elements, from dependent schema(s) 323, that are not referenced in schema 321.

After extracting the given schema element in the above manner, schema processor 306 then determines whether the extracted schema element defines a member of a substitution group or an XML element type or subtype thereof. If the extracted schema element is neither, schema processor 306 stores the schema element in the corresponding data structure of in-memory model 325. If schema processor 306 determines that the extracted schema element defines an XML element type or a subtype, in accordance with the techniques described herein schema processor 306 stores the schema element in a "type" hash table and a "type" array that are included in in-memory model 325. If schema processor 306 determines that the extracted schema element defines a member of a substitution group, in accordance with the techniques described herein schema processor 306 stores the schema element in a "substitution group" hash table and a "substitution group" array that are included in in-memory model 325.

By processing each schema element of schema 321 in the above manner, schema processor 306 builds (compiles) in-memory model 325 for schema 321 in accordance with the techniques described herein. Thus, the techniques described herein provide for more efficient processing of dependent XML schemas because the dependent XML schemas (and any other schemas that may be depending therefrom) are not loaded into volatile memory in their entirety at any given time. Further, the techniques described herein provide for more efficient building of an in-memory model of an XML schema because only those dependent schema elements, which are actually needed in the in-memory model, are extracted from the data structures stored on persistent storage.

Processing of Inter-Referenced Schemas

In many operational contexts (e.g., such as a set of inter-dependent industry XML schemas), a dependent XML schema may be itself dependent on a parent XML schema. That is, the parent XML schema may reference one or more schema elements in the dependent XML schema, and the dependent XML schema may reference one or more schema elements in the parent XML schema. In these operational contexts, it may happen that there are some dependent schema elements that are not fully resolved (because of their dependency on the parent XML schema) when the dependent XML schema is pre-processed for the purpose of storing the dependent schema elements in compiled data structures on persistent storage.

For such operational contexts, the techniques described herein provide for tracking unresolved dependent schema elements as the dependent schema elements are being stored in compiled data structures on persistent storage. For example, while processing schema elements from the dependent XML schemas, the techniques described herein provide for processing the dependent schema elements to the extent possible without referencing the parent XML schema, and tracking the identities (e.g., such as QName identifiers) of those dependent schema elements that could not be fully resolved because of their dependency on the parent XML schema. Thereafter, during the process of building the in-memory model of the parent XML schema, any unresolved dependent schema elements are fully resolved against the parent XML schema. So long as the unresolved dependent schema elements (which are stored in compiled data structures on persistent storage) reference the parent XML schema and can be resolved thereagainst, a schema processor building the in-memory model of the parent XML schema would be able to resolve such dependent schema elements one by one as the schema processor extracts each dependent schema element from the compiled data structures and stores this dependent schema element as part of the in-memory model.

Figure 4:
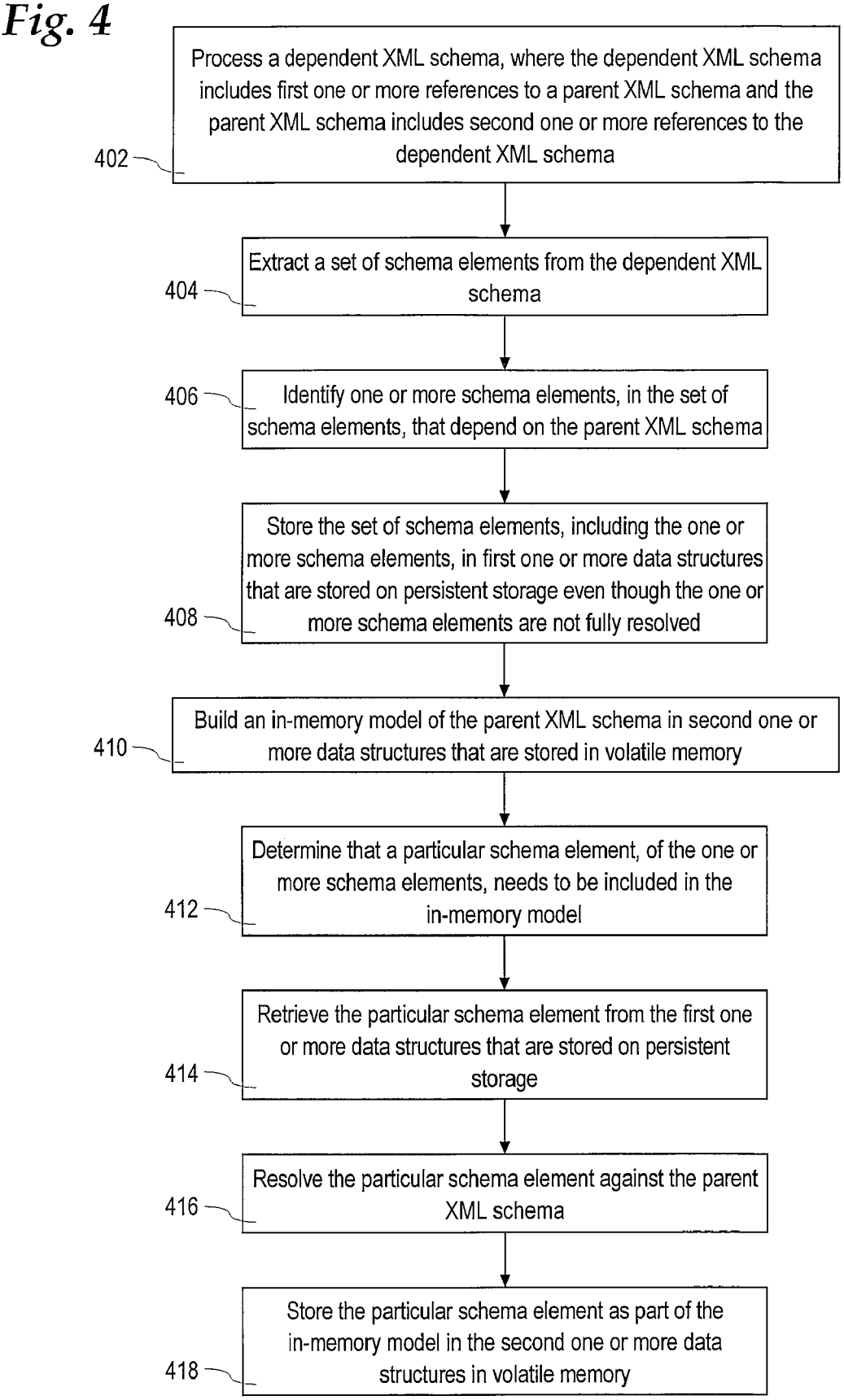
FIG. 4 is a flow diagram that illustrates an example method for generating an in-memory model of an XML schema according to one embodiment.

FIG. 4 is a flow diagram that illustrates an example method for generating an in-memory model of an XML schema according to the techniques described herein. In some embodiments, steps 402 to 408 of the method illustrated in FIG. 4 are performed by an extraction logic that is executed by one or more computing devices (e.g., such as extraction logic 310 of FIG. 3), and steps 410 to 418 are performed by a schema processor (e.g., such as schema processor 306 of FIG. 3) that is executed by one or more computing devices. It is noted, however, that in various embodiments the method illustrated in FIG. 4 may be performed by various types of logic that may be included in various computer processes or entities including, but not limited to, database servers, web servers, application servers, standalone programs, query processors executing on middleware platforms, and various client and/or client-server applications. Thus, the use of extraction logic and schema processor in the description of FIG. 4 hereinafter is for illustrative purposes only, and the example method illustrated in FIG. 4 is not limited to being performed by any particular type of computer process or any particular type of logic.

Referring to FIG. 4, in step 402 an extraction logic processes a dependent XML schema, where the dependent XML schema includes one or more references to a parent XML schema and the parent XML schema includes one or more references to the dependent XML schema. In other words, the parent XML schema and the dependent XML schema are inter-referenced (or inter-dependent). As part of processing the dependent XML schema, the extraction logic performs steps that include steps 404 to 408.

In step 404, the extraction logic extracts a set of schema elements from the XML schema. In some embodiments, the set of extracted schema elements includes only those schema elements that would need to be included in the in-memory of the parent XML schema. In other embodiments, the extraction logic may be configured to determine which schema elements to extract from the dependent XML schema based on various types of information such as, for example, a set of heuristics, user-specified data, system-specified information or configuration, or any other type of information or combinations thereof.

In step 406, the extraction logic identifies, within the set of extracted schema elements, one or more schema elements that depend on the parent XML schema. For example, the extraction logic may determine that a particular schema element includes one or more references to one or more schema elements in the parent XML schema. As part of this step, the extraction logic tracks the identified schema elements as unresolved dependent schema elements. Tracking an unresolved dependent schema element may be performed by storing, in association with the dependent schema element, metadata information that indicates that the dependent schema element is not fully resolved. For example, in some embodiments, the extraction logic may store along with the dependent schema element a flag (which indicates that the dependent schema element is not fully resolved) and a schema identifier of the schema against which the dependent schema element needs to be further resolved. In some embodiments, the extraction logic may store the identifier (e.g., such as a QName identifier) of the dependent schema element in one or more data structures in volatile memory or on persistent storage, where the one or more data structures may be any data structures (e.g., such as lists, arrays, tables, etc.) that are suitable for storing metadata information that identifies schema elements. Thus, the examples described herein of how unresolved dependent schema elements may be tracked are to be regarded in illustrative rather than a restrictive sense.

In step 408, the extraction logic stores the set of extracted dependent schema elements, including the one or more unresolved dependent schema elements, in one or more compiled data structures on persistent storage (e.g., such as data structures 314 and 316 of FIG. 3). The extraction logic stores the unresolved dependent schema elements in the compiled data structures even though these dependent schema elements have not been fully resolved.

It is noted that the above description of steps 404 to 408 is to be regarded in an illustrative sense because an implementation of the method in FIG. 4 does not necessarily need to determine all the dependent schema elements participating in the to-be-extracted set at the same time and does not necessarily need to determine the unresolved dependent schema elements at the same time. For example, in some embodiments the extraction logic can extract the dependent schema elements by iteratively processing the dependent XML schema. In these embodiments, the extraction logic may traverse the dependent XML schema and, upon encountering a dependent schema element that needs to be extracted, may extract the dependent schema element (e.g., as indicated in step 404), may determine whether this dependent schema element is unresolved (e.g., as indicated in step 406), and may store the dependent schema element in compiled data structures on persistent storage (e.g., as indicated in step 408).

After the dependent XML schema is processed in the above manner, in step 410 a schema processor builds an in-memory model of the parent XML schema. As part of building the in-memory model of the parent XML schema, the schema processor performs steps that include steps 412 to 418. For example, the schema processor may traverse, iteratively process, or otherwise access each schema element in the parent XML schema that needs to be included in the in-memory model. As part of processing each schema element, the schema processor retrieves the schema element and determines at least what kind that schema element is and whether that schema element is fully resolved. If the schema element being processed is fully resolved, the schema processor stores this schema element as part of the in-memory model in accordance with the techniques described herein (e.g., if the schema element defines an XML type or a subtype, then the schema element is stored in a "type" hash table and a "type" array; if the schema element defines a member of a substitution group, then the schema element is stored in a "substitution group" hash table and a "substitution group" array; etc). If the schema element being processed is a dependent schema element that is extracted from the compiled data structures on persistent storage and that is not fully resolved, the schema processor may perform steps 412 to 418.

In step 412, the schema processor accesses a particular schema element that needs to be included in the parent XML schema and determines that the particular schema element is not fully resolved. For example, the schema processor may determine that an identifier of the schema element is stored in an in-memory or persistent data structure that identifies unresolved dependent schema elements. In another example, the schema processor may determine that metadata information (e.g., such as a flag) that is stored along with the dependent schema element indicates that the dependent schema element is not fully resolved.

In step 414, the schema processor retrieves the particular schema element from the compiled data structures stored on persistent storage. The schema processor then resolves the particular schema element in step 416. For example, the schema processor may fully resolve the particular schema element against the parent XML schema, where fully resolving the particular schema element may comprise including within the particular schema element some information (e.g., such as an element, attribute, etc.) that is stored in one or more schema elements of the parent XML schema.

After fully resolving the particular schema element, in step 418 the schema processor stores the particular schema element as part of the in-memory model of the parent XML schema.

In this manner, the techniques described herein provide for efficient processing of inter-referenced XML schemas because the computationally expensive processing to fully resolve dependent schema elements is avoided in those circumstances in which a partially-resolved dependent schema element can be fully resolved at the time when an in-memory model that needs that schema element is being built.

In some embodiments, the processing of schema elements from dependent XML schemas may involve one or more intermediate stages, during which only those dependent schema elements that are actually needed are extracted from the dependent XML schemas and processed/stored in the compiled data structures on persistent storage. In order to provide for efficient use of volatile memory, in these embodiments the techniques described herein provide for using separate recursive calls to process separate dependent schema elements.

For example, in some embodiments a dependent schema element is extracted from the relevant dependent XML schema by executing a call (in a process context such as, for example, a database server context) that is allocated its own separate portion of volatile memory. Thus, a call for extracting a dependent schema element uses its own portion of volatile memory. Since the portions of volatile memory used by such calls only have an intermediate use, the techniques described herein provide for invoking such calls recursively. This means that the extraction of separate dependent schema elements is executed as separate recursive calls, where at the end of each call the portion of volatile memory used in that call is automatically released. In this manner, the portion of volatile memory used to intermediately process each dependent schema element is released as soon as that dependent schema element is stored in compiled data structures on persistent storage. Thus, instead of loading an entire dependent XML schema in volatile memory for processing, the techniques described herein provide for loading into memory only those dependent schema elements that are actually needed and for releasing the portion of the memory used for processing a dependent schema element as soon as that dependent schema element is stored in compiled data structures on persistent storage.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. In various embodiments, any or all of the above-described schema processor, various types of logic, and various types of servers (including a database server) may be executed or otherwise performed by such special-purpose computing devices, alone or in combination with other hardware of software components.

Figure 5:
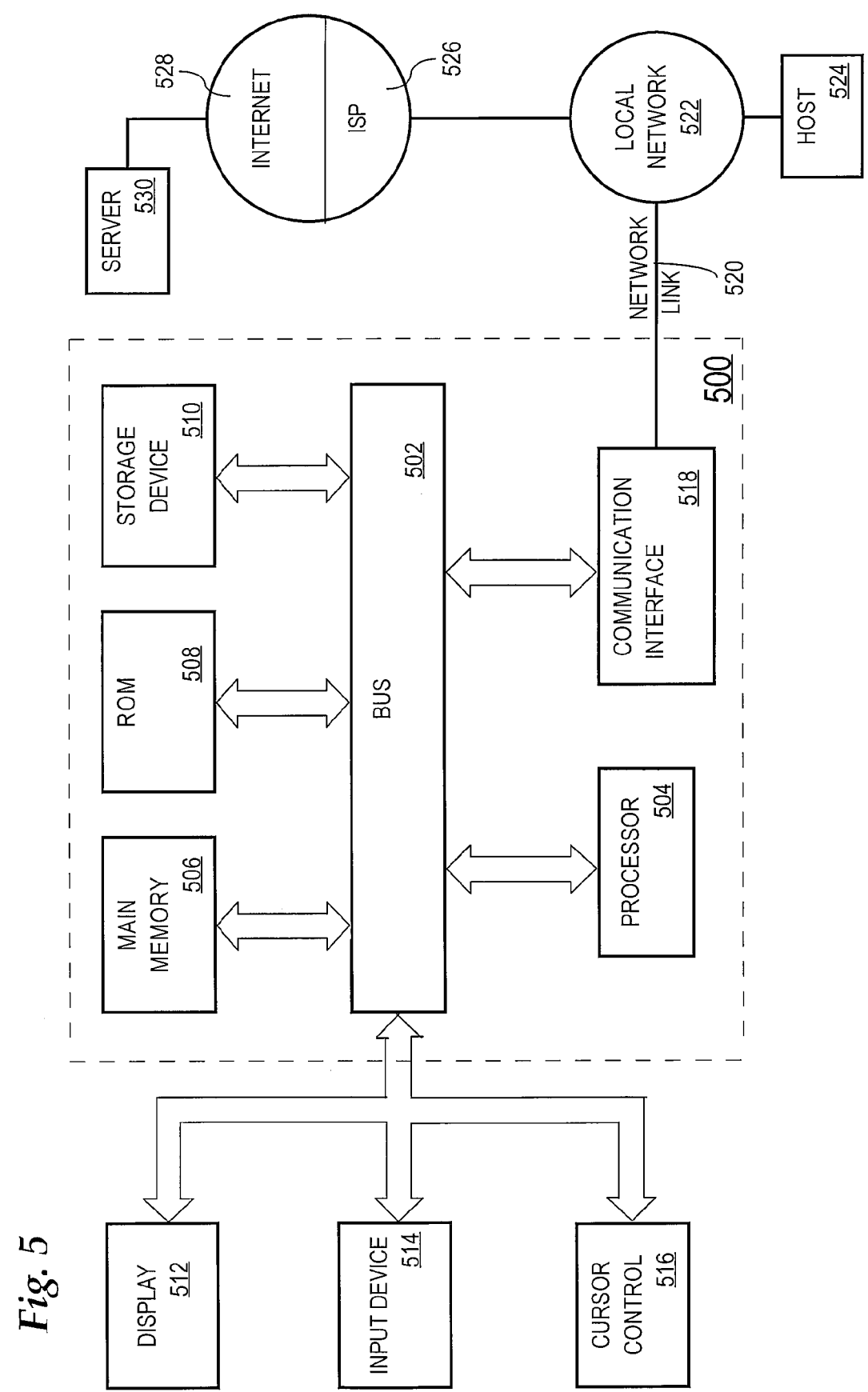
FIG. 5 is a block diagram that illustrates an example computer system on which embodiments may be implemented.

For example, FIG. 5 is a block diagram that illustrates a computer system 500 upon which an embodiment of the techniques described herein may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose computing device that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or a Liquid Crystal Display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the techniques described herein have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory storage media storing one or more sequences of instructions for building an in-memory model of an extensible markup language (XML) schema, which instructions, when executed by one or more processors, cause the one or more processors to perform steps comprising:
    initializing, within one or more memory blocks of a plurality of memory blocks that have been allocated in volatile memory, a hash table and an array for storing a particular set of schema elements of the XML schema, wherein the particular set of schema elements is one of:
        schema elements that define XML element types in the XML schema, the XML element types each having one or more subtypes; or
        schema elements that define substitution groups in the XML schema;
    for each schema element of the particular set of schema elements, storing the schema element as part of the in-memory model by performing steps comprising:
        accessing the schema element, wherein the schema element has a plurality of sub-elements;
        storing the plurality of sub-elements as a plurality of entries into a first portion of the array;
        storing, into a second portion of the array, a plurality of pointers that respectively reference the plurality of entries; and
        storing one or more entries into the hash table by using an identifier of the schema element as a hash key, wherein the one or more entries in the hash table indicate one or more of the plurality of pointers stored in the second portion of the array.

2. The one or more non-transitory storage media as recited in claim 1, wherein the one or more sequences of instructions further comprise instructions which, when executed by the one or more processors, cause the one or more processors to perform:
    based on the in-memory model of the XML schema, encoding an XML document to generate encoded XML data;
    wherein the XML document has been validated as an instance that conforms to the XML schema; and
    performing one or more of:
        storing the encoded XML data as a representation of the XML document; and
        transferring the encoded XML data.

3. The one or more non-transitory storage media as recited in claim 1, wherein the one or more sequences of instructions further comprise instructions which, when executed by the one or more processors, cause the one or more processors to perform:
    based on the in-memory model of the XML schema, decoding encoded XML data to generate the XML document;
    wherein the XML document has been validated as an instance that conforms to the XML schema.

4. The one or more non-transitory storage media as recited in claim 1, wherein the one or more sequences of instructions further comprise instructions which, when executed by the one or more processors, cause the one or more processors to perform:
    performing one or more operations based on the in-memory model of the XML schema, wherein performing the one or more operations does not include validating XML data against the in-memory model.

5. The one or more non-transitory storage media as recited in claim 1, wherein the one or more sequences of instructions further comprise instructions which, when executed by the one or more processors, cause the one or more processors to perform:
    receiving an XPath expression that specifies an XML element; and
    evaluating the XPath expression against the in-memory model of the XML schema to determine whether the XML element can occur in one or more XML documents that conform to the XML schema.

6. The one or more non-transitory storage media as recited in claim 1, wherein the instructions that cause initializing the hash table and the array further comprise instructions which, when executed by the one or more processors, cause the one or more processors to perform:
    accessing each of the particular set of schema elements to determine at least:
        the total number of elements included across all of the particular set of schema elements; and
        the total amount of memory that would be required to store the particular set of schema elements; and
    initializing the first portion of the array and the second portion of the array based at least on the total number of elements and the total amount of memory.

7. The one or more non-transitory storage media as recited in claim 1, wherein the one or more sequences of instructions further comprise instructions which, when executed by the one or more processors, cause the one or more processors to perform retrieving a particular sub-element from the in-memory model without performing a traversal of the XML schema, wherein retrieving the particular sub-element comprises:
    based on a particular identifier of a particular schema element that has the particular sub-element, performing a lookup of the particular identifier in the hash table to determine a particular pointer in the second portion of the array;
    using the particular pointer to locate a particular entry, in the first portion of the array, that stores the particular sub-element; and
    accessing the particular entry to retrieve the particular sub-element.

8. The one or more non-transitory storage media as recited in claim 1, wherein the particular set of schema elements comprises schema elements that define the XML element types in the XML schema, the XML element types each having one or more subtypes.

9. The one or more non-transitory storage media as recited in claim 1, wherein the particular set of schema elements comprises schema elements that define the substitution groups in the XML schema.

10. The one or more non-transitory storage media as recited in claim 1, wherein the XML schema includes references to one or more XML schemas that are different than the XML schema, and wherein the particular set of schema elements includes one or more schema elements that are included in the one or more XML schemas.

11. The one or more non-transitory storage media as recited in claim 1, wherein the XML schema includes references to one or more XML schemas that are different than the XML schema, wherein the XML schema and the one or more XML schemas are part of a set of XML schemas that defines data requirements in accordance with a standard for a particular industry.

12. The one or more non-transitory storage media as recited in claim 1, wherein the in-memory model is associated with a set of XML documents that were previously validated against the XML schema.

13. The one or more non-transitory storage media as recited in claim 1, wherein the one or more sequences of instructions further comprise instructions which, when executed by the one or more processors, cause the one or more processors to perform:
    allocating, in the volatile memory, the plurality of memory blocks for storing the in-memory model of the XML schema, the plurality of memory blocks having an equal size;
    wherein each of the plurality of memory blocks is a heap and the size of the heap is such that the heap can store multiple schema elements of the XML schema, wherein at least one schema element of the multiple schema elements is included in a dependent XML schema that is referenced in the XML schema.

14. The one or more non-transitory storage media as recited in claim 1, wherein:
    the XML schema includes references to one or more schema elements that are included in one or more XML schemas that are different than the XML schema; and
    the one or more sequences of instructions further comprise instructions which, when executed by the one or more processors, cause the one or more processors to perform:
        storing, as part of the in-memory model, a first schema element of the XML schema in a first memory block of the plurality of memory blocks; and
        storing, as part of the in-memory model, the one or more schema elements of the one or more XML schemas in the first memory block without allocating any separate memory blocks for the one or more schema elements.

15. One or more non-transitory storage media storing one or more sequences of instructions for generating an in-memory model of an extensible markup language (XML) schema, which instructions, when executed by one or more processors, cause the one or more processors to perform steps comprising:
    extracting a set of schema elements from one or more dependent XML schemas that are different than the XML schema, wherein the XML schema includes references to the one or more dependent XML schemas;
    wherein the set of schema elements from the one or more dependent XML schemas includes one or more of:
        a parent element that defines an XML element type, and sub-elements of the parent element that define sub-types of the XML element type; and
        a head element that defines a substitution group, and sub-elements of the head element that define members of the substitution group;
    storing the set of schema elements in first one or more data structures that are stored on persistent storage; and
    building the in-memory model of the XML schema, wherein building the in-memory model comprises:
        identifying only those one or more schema elements, of the set of schema elements, that need to be included in the in-memory model;
        retrieving the one or more schema elements from the first one or more data structures that are stored on persistent storage; and
        storing the one or more schema elements as part of the in-memory model in second one or more data structures that are stored in volatile memory.

16. The one or more non-transitory storage media as recited in claim 15, wherein the set of schema elements further includes at least one schema element that is included in at least one other XML schema that is referenced by at least one of the one or more dependent XML schemas.

17. The one or more non-transitory storage media as recited in claim 15, wherein the instructions that cause building the in-memory model of the XML schema further comprise instructions which, when executed by the one or more processors, cause the one or more processors to perform:
    building the in-memory model without loading into the volatile memory and without traversing:
        the one or more dependent XML schemas; and
        any other XML schemas that are referenced by the one or more dependent XML schemas.

18. The one or more non-transitory storage media as recited in claim 15, wherein the instructions that cause building the in-memory model of the XML schema further comprise instructions which, when executed by the one or more processors, cause the one or more processors to perform:
    building the in-memory model without loading into the volatile memory any schema elements, from the first one or more data structures, that are not referenced by the XML schema.

19. The one or more non-transitory storage media as recited in claim 15, wherein:
    the set of schema elements from the one or more dependent XML schemas includes:
        parent elements that define XML element types, and sub-elements of the parent elements that define sub-types of the XML element types; and
        head elements that define substitution groups, and sub-elements of the head elements that define members of the substitution groups; and
    the first one or more data structures on the persistent storage include:
        a first data structure for storing the head elements and the sub-elements of the head elements; and
        a second data structure for storing the parent elements and the sub-elements of the parent elements, wherein the second data structure is different than the first data structure.

20. The one or more non-transitory storage media as recited in claim 15, wherein:
    the first one or more data structures are B-tree structures that use element identifiers as keys; and
    the instructions that cause retrieving the one or more schema elements from the first one or more data structures comprise instructions which, when executed by the one or more processors, cause the one or more processors to perform:
        based on a particular element identifier of a particular schema element, performing a lookup in the first one or more data structures to determine a set of elements and sub-elements that match to the particular element identifier; and
        retrieving the set of elements and sub-elements from the first one or more data structures.

21. One or more non-transitory storage media storing one or more sequences of instructions for generating in-memory models of extensible markup language (XML) schemas which instructions, when executed by one or more processors, cause the one or more processors to perform steps comprising:
 processing a dependent XML schema, wherein the dependent XML schema includes first one or more references to a parent XML schema and the parent XML schema includes second one or more references to the dependent XML schema, wherein processing the dependent XML schema comprises:
  extracting a set of schema elements from the dependent XML schema;
  identifying one or more schema elements, in the set of schema elements from the dependent XML schema, that depend on the parent XML schema; and
  storing the set of schema elements, including the one or more schema elements, in first one or more data structures that are stored on persistent storage; and
 building an in-memory model of the parent XML schema in second one or more data structures that are stored in volatile memory, wherein building the in-memory model comprises:
  determining that a particular schema element, of the one or more schema elements, needs to be included in the in-memory model;
  retrieving the particular schema element from the first one or more data structures that are stored on persistent storage;
  resolving the particular schema element against the parent XML schema; and
  storing the particular schema element as part of the in-memory model in the second one or more data structures.

22. The one or more non-transitory storage media as recited in claim 21, wherein the instructions that cause processing the dependent XML schema further comprise instructions which, when executed by the one or more processors, cause the one or more processors to perform:
 for each schema element, of the set of schema elements from the dependent XML schema, performing steps comprising:
  extracting the schema element from the dependent XML schema and storing the schema element in the first one or more data structures by executing a separate recursive call that uses a portion of the volatile memory; and
  releasing the portion of the volatile memory as soon as the schema element has been stored in the first one or more data structures on the persistent storage.

23. A method, comprising:
 initializing, within one or more memory blocks of a plurality of memory blocks that have been allocated in volatile memory, a hash table and an array for storing a particular set of schema elements of the XML schema, wherein the particular set of schema elements is one of:
  schema elements that define XML element types in the XML schema, the XML element types each having one or more subtypes; or
  schema elements that define substitution groups in the XML schema;
 for each schema element of the particular set of schema elements, storing the schema element as part of the in-memory model by performing steps comprising:
  accessing the schema element, wherein the schema element has a plurality of sub-elements;
  storing the plurality of sub-elements as a plurality of entries into a first portion of the array;
  storing, into a second portion of the array, a plurality of pointers that respectively reference the plurality of entries; and
  storing one or more entries into the hash table by using an identifier of the schema element as a hash key, wherein the one or more entries in the hash table indicate one or more of the plurality of pointers stored in the second portion of the array;
 wherein the method is performed by one or more computing devices.

24. The method of claim 23, further comprising:
 based on the in-memory model of the XML schema, encoding an XML document to generate encoded XML data;
 wherein the XML document has been validated as an instance that conforms to the XML schema; and
 performing one or more of:
  storing the encoded XML data as a representation of the XML document; and
  transferring the encoded XML data.

25. The method of claim 23, further comprising:
 based on the in-memory model of the XML schema, decoding encoded XML data to generate an XML document;
 wherein the XML document has been validated as an instance that conforms to the XML schema.

26. The method of claim 23, further comprising:
 performing one or more operations based on the in-memory model of the XML schema, wherein performing the one or more operations does not include validating XML data against the in-memory model.

27. The method of claim 23, further comprising:
 receiving an XPath expression that specifies an XML element; and
 evaluating the XPath expression against the in-memory model of the XML schema to determine whether the XML element can occur in one or more XML documents that conform to the XML schema.

28. The method of claim 23, further comprising:
 accessing each of the particular set of schema elements to determine at least:
  the total number of elements included across all of the particular set of schema elements; and
  the total amount of memory that would be required to store the particular set of schema elements; and
 initializing the first portion of the array and the second portion of the array based at least on the total number of elements and the total amount of memory.

29. The method of claim 23, further comprising:
 retrieving a particular sub-element from the in-memory model without performing a traversal of the XML schema,
 wherein retrieving the particular sub-element comprises:
  based on a particular identifier of a particular schema element that has the particular sub-element, performing a lookup of the particular identifier in the hash table to determine a particular pointer in the second portion of the array;
  using the particular pointer to locate a particular entry, in the first portion of the array, that stores the particular sub-element; and
  accessing the particular entry to retrieve the particular sub-element.

30. The method of claim 23, wherein the particular set of schema elements comprises schema elements that define the XML element types in the XML schema, the XML element types each having one or more subtypes.

31. The method of claim 23, wherein the particular set of schema elements comprises schema elements that define the substitution groups in the XML schema.

32. The method of claim 23, wherein the XML schema includes references to one or more XML schemas that are different than the XML schema, and wherein the particular set of schema elements includes one or more schema elements that are included in the one or more XML schemas.

33. The method of claim 23, wherein the XML schema includes references to one or more XML schemas that are different than the XML schema, wherein the XML schema and the one or more XML schemas are part of a set of XML schemas that defines data requirements in accordance with a standard for a particular industry.

34. The method of claim 23, wherein the in-memory model is associated with a set of XML documents that were previously validated against the XML schema.

35. The method of claim 23, further comprising:
allocating, in the volatile memory, the plurality of memory blocks for storing the in-memory model of the XML schema, the plurality of memory blocks having an equal size;
wherein each of the plurality of memory blocks is a heap and the size of the heap is such that the heap can store multiple schema elements of the XML schema, wherein at least one schema element of the multiple schema elements is included in a dependent XML schema that is referenced in the XML schema.

36. The method of claim 23, wherein:
the XML schema includes references to one or more schema elements that are included in one or more XML schemas that are different than the XML schema; and
wherein the method further comprises:
storing, as part of the in-memory model, a first schema element of the XML schema in a first memory block of the plurality of memory blocks; and
storing, as part of the in-memory model, the one or more schema elements of the one or more XML schemas in the first memory block without allocating any separate memory blocks for the one or more schema elements.

37. A method comprising:
extracting a set of schema elements from one or more dependent XML schemas that are different than the XML schema, wherein the XML schema includes references to the one or more dependent XML schemas;
wherein the set of schema elements from the one or more dependent XML schemas includes one or more of:
a parent element that defines an XML element type, and sub-elements of the parent element that define subtypes of the XML element type; and
a head element that defines a substitution group, and sub-elements of the head element that define members of the substitution group;
storing the set of schema elements in first one or more data structures that are stored on persistent storage; and
building the in-memory model of the XML schema, wherein building the in-memory model comprises:
identifying only those one or more schema elements, of the set of schema elements, that need to be included in the in-memory model;
retrieving the one or more schema elements from the first one or more data structures that are stored on persistent storage; and
storing the one or more schema elements as part of the in-memory model in second one or more data structures that are stored in volatile memory;
wherein the method is performed by one or more computing devices.

38. The method of claim 37, wherein the set of schema elements further includes at least one schema element that is included in at least one other XML schema that is referenced by at least one of the one or more dependent XML schemas.

39. The method of claim 37, further comprising:
building the in-memory model without loading into the volatile memory and without traversing:
the one or more dependent XML schemas; and
any other XML schemas that are referenced by the one or more dependent XML schemas.

40. The method of claim 37, further comprising:
building the in-memory model without loading into the volatile memory any schema elements, from the first one or more data structures, that are not referenced by the XML schema.

41. The method of claim 37, wherein:
the set of schema elements from the one or more dependent XML schemas includes:
parent elements that define XML element types, and sub-elements of the parent elements that define subtypes of the XML element types; and
head elements that define substitution groups, and sub-elements of the head elements that define members of the substitution groups; and
the first one or more data structures on the persistent storage include:
a first data structure for storing the head elements and the sub-elements of the head elements; and
a second data structure for storing the parent elements and the sub-elements of the parent elements, wherein the second data structure is different than the first data structure.

42. The method of claim 37, wherein:
the first one or more data structures are B-tree structures that use element identifiers as keys; and
the method further comprises:
based on a particular element identifier of a particular schema element, performing a lookup in the first one or more data structures to determine a set of elements and sub-elements that match to the particular element identifier; and
retrieving the set of elements and sub-elements from the first one or more data structures.

43. A method, comprising:
processing a dependent XML schema, wherein the dependent XML schema includes first one or more references to a parent XML schema and the parent XML schema includes second one or more references to the dependent XML schema, wherein processing the dependent XML schema comprises:
extracting a set of schema elements from the dependent XML schema;
identifying one or more schema elements, in the set of schema elements from the dependent XML schema, that depend on the parent XML schema; and
storing the set of schema elements, including the one or more schema elements, in first one or more data structures that are stored on persistent storage; and
building an in-memory model of the parent XML schema in second one or more data structures that are stored in volatile memory, wherein building the in-memory model comprises:

determining that a particular schema element, of the one or more schema elements, needs to be included in the in-memory model;
retrieving the particular schema element from the first one or more data structures that are stored on persistent storage;
resolving the particular schema element against the parent XML schema; and
storing the particular schema element as part of the in-memory model in the second one or more data structures;
wherein the method is performed by one or more computing devices.

44. The method of claim 43, further comprising:

for each schema element, of the set of schema elements from the dependent XML schema, performing steps comprising:
extracting the schema element from the dependent XML schema and storing the schema element in the first one or more data structures by executing a separate recursive call that uses a portion of the volatile memory; and
releasing the portion of the volatile memory as soon as the schema element has been stored in the first one or more data structures on the persistent storage.

* * * * *

UNITED STATES PATENT AND TRADEMARK OFFICE
CERTIFICATE OF CORRECTION

| | | |
|---|---|---|
| PATENT NO. | : 8,209,361 B2 | |
| APPLICATION NO. | : 12/689729 | |
| DATED | : June 26, 2012 | |
| INVENTOR(S) | : Idicula et al. | |

It is certified that error appears in the above-identified patent and that said Letters Patent is hereby corrected as shown below:

In column 4, line 34, after "type" delete "a" and insert -- or a --, therefor.

In column 6, line 51, delete "instance" and insert -- instance: --, therefor.

In column 33, line 25, in Claim 13, delete "and the" and insert -- and a --, therefor.

In column 35, line 56, in Claim 23, delete "of the" and insert -- of an --, therefor.

In column 35, line 64, in Claim 23, delete "of the" and insert -- of an --, therefor.

In column 36, line 25, in Claim 25, delete "an XML" and insert -- the XML --, therefor.

In column 37, line 27, in Claim 35, delete "and the" and insert -- and a --, therefor.

In column 37, line 47, in Claim 37, delete "than the" and insert -- than an --, therefor.

In column 37, line 60, in Claim 37, delete "building the" and insert -- building an --, therefor.

Signed and Sealed this
Twenty-fifth Day of September, 2012

David J. Kappos
*Director of the United States Patent and Trademark Office*